US012794115B2

(12) United States Patent
Li et al.

(10) Patent No.: US 12,794,115 B2
(45) Date of Patent: Nov. 10, 2026

(54) ANTENNA MOUNTS AND RELATED ASSEMBLIES

(71) Applicant: Outdoor Wireless Networks LLC, Richardson, TX (US)

(72) Inventors: Zhen Li, Suzhou (CN); Maosheng Liu, Suzhou (CN); Puliang Tang, Suzhou (CN); Yiding Wang, Suzhou (CN)

(73) Assignee: OUTDOOR WIRELESS NETWORKS LLC, Richardson, TX (US)

( * ) Notice: Subject to any disclaimer, the term of this patent is extended or adjusted under 35 U.S.C. 154(b) by 2 days.

(21) Appl. No.: 19/198,374

(22) Filed: May 5, 2025

(65) Prior Publication Data

US 2025/0364716 A1 Nov. 27, 2025

(30) Foreign Application Priority Data

May 22, 2024 (CN) ......................... 202410637031.1

(51) Int. Cl.
*H01Q 1/24* (2006.01)
*H01Q 5/50* (2015.01)

(52) U.S. Cl.
CPC ............... *H01Q 1/246* (2013.01); *H01Q 5/50* (2015.01)

(58) Field of Classification Search
CPC H01Q 1/38; H01Q 1/48; H01Q 13/24; H01Q 19/08; H01Q 21/205; H01Q 13/02; H01Q 9/0485; H01Q 1/46; H01Q 3/26; H01Q 1/2291; H01Q 3/08; H01Q 1/1228; H01Q 13/06; H01Q 21/067; H01Q 1/12; H01Q 1/22; H01Q 13/28; H01Q 21/00; H01Q 21/064; H01Q 15/08; H01Q 15/24; H01Q 19/062; H01Q 3/10; H01Q 3/30; H01Q 1/246; H01Q 1/36; H01Q 13/10; H01Q 25/007; H01Q 3/245; H01Q 1/088; H01Q 1/103; H01Q 1/1207; H01Q 1/243; H01Q 1/44; H01Q 1/50; H01Q 13/106; H01Q 21/22; H01Q 21/28; H01Q 25/002; H01Q 25/005; H01Q 3/22; H01Q 3/24; H01Q 3/247; H01Q 3/34; H01Q 3/36; H01Q 1/24; H01Q 1/281; H01Q 1/42; H01Q 13/0241; H01Q 13/025; H01Q 13/103; H01Q 15/02; H01Q 15/14;

(Continued)

(56) References Cited

U.S. PATENT DOCUMENTS

2016/0365624 A1 12/2016 Maley et al.

*Primary Examiner* — Monica C King
(74) *Attorney, Agent, or Firm* — Myers Bigel, P.A.

(57) ABSTRACT

The present application is directed to an antenna mounting assembly. The assembly includes upper and lower bracket assemblies. The upper bracket assembly includes a first bracket with a pair of apertures each having a convex tapered edge and a second bracket with a pair of pins extending upwardly therefrom. Each pin is configured to be received by a respective aperture of the first bracket to define an engagement point between the first and second brackets. The lower bracket assembly includes a first bracket having opposing flanged ends extending downwardly, each flanged end having an aperture, and a second bracket having opposing flanged ends extending downwardly, each flanged end having an aperture. The flanged ends of the first bracket are configured to align with the flanged ends of the second bracket such that fasteners are received through the aligned apertures to define an engagement point between the first and second brackets.

20 Claims, 13 Drawing Sheets

(58) Field of Classification Search
CPC ...... H01Q 15/16; H01Q 15/242; H01Q 19/09; H01Q 19/108; H01Q 19/19; H01Q 19/193; H01Q 21/06; H01Q 21/061; H01Q 21/20; H01Q 25/04; H01Q 3/18; H01Q 3/242; H01Q 5/50; H01Q 9/04
See application file for complete search history.

ANTENNA MOUNTS AND RELATED ASSEMBLIES

RELATED APPLICATION(S)

The present application claims priority to and the benefit of Chinese Application for Invention No. 202410637031.1, filed May 22, 2024, the disclosures of which are hereby incorporated by reference herein in full.

FIELD OF THE INVENTION

The present invention relates generally to telecommunications equipment, and more particularly to, mounting assemblies for metrocell base station antennas for cellular communications systems.

BACKGROUND OF THE INVENTION

Cellular communications systems are well known in the art. In a typical cellular communications system, a geographic area is divided into a series of regions that are referred to as "cells," and each cell is served by a base station. Typically, a cell may serve users who are within a distance of, for example, 2-20 kilometers from the base station. The base station may include baseband equipment, radios and antennas that are configured to provide two-way radio frequency ("RF") communications with fixed and mobile subscribers ("users") that are positioned throughout the cell. In many cases, the cell may be divided into a plurality of "sectors" in the azimuth (horizontal) plane, and separate antennas provide coverage to each of the sectors. The antennas are often mounted on a tower or other raised structure, with the radiation beam ("antenna beam") that is generated by each antenna directed outwardly to serve a respective sector. Typically, a base station antenna includes one or more phase-controlled arrays of radiating elements, with the radiating elements arranged in one or more vertical columns when the antenna is mounted for use. Herein, "vertical" refers to a direction that is perpendicular relative to the plane defined by the horizon.

In order to increase capacity, cellular operators have been deploying so-called "metrocell" cellular base stations (which are also often referred to as "small cell" base stations). A metrocell base station refers to a low-power base station that has a much smaller range than a typical "macro cell" base station. A metrocell base station may be designed to serve users who are within, for example about five hundred meters of the metrocell antenna, although many metrocell base stations provide coverage to smaller areas such as areas having a radius of about 100-200 meters or less. Metrocell base stations are often deployed in high traffic regions within a macro cell so that the macro cell base station can offload traffic to the metrocell base station.

Metrocell base station antennas are typically housed within a generally cylindrical radome and typically include three vertically-oriented linear arrays of radiating elements. The three linear arrays of radiating elements are mounted on respective reflector panels that collectively define a triangular tube within the generally cylindrical radome. Conventionally, a metrocell base station antenna is mounted on top of a utility pole such as a telephone pole, an electric power pole, a light pole or the like. With the recent deployment of fifth generation ("5G") cellular systems, metrocell antennas are now being deployed in much larger numbers and, as a result, suitable mounting locations for metrocell antennas (e.g., utility poles with a suitable mounting location for the metrocell antenna at the top of the pole that do not already have a metrocell antenna mounted thereon) are not available in many locations. If a suitable utility pole is not available, then the metrocell antennas are often mounted further down the utility poles, with the antennas offset to one side of the respective poles. However, zoning ordinances may not allow such offset mounting in some jurisdictions, and even when allowed, the resulting configuration is generally considered to be sub-optimum by wireless operators, because the metrocell antenna is much more prominent (making vandalism more likely) and less attractive, and because the utility pole scatters a portion of the antenna beam generated by the metrocell antenna, which may degrade performance. Exemplary wrap-around antennas that can be mounted around a utility pole (as opposed to on the top of the utility pole) are described in U.S. Patent Publication No. 2016/0365624, the disclosures of which are incorporated herein by reference.

FIG. 1 is a schematic diagram of a conventional metrocell base station 10. As shown in FIG. 1, the metrocell base station 10 includes an antenna 20 that may be mounted on a raised structure 30 such as a utility pole. The antenna 20 may be designed to have an omnidirectional antenna pattern in the azimuth plane, meaning that at least one antenna beam generated by the antenna 20 may extend through a full 360 degree circle in the azimuth plane. Typically, the antenna 20 has a generally cylindrical shape and is mounted at the top of the utility pole.

The metrocell base station 10 also includes base station equipment such as a baseband unit 40 and a radio 42. While the radio 42 is shown as being co-located with the baseband equipment 40 at the bottom of the antenna tower 30, it will be appreciated that the radio 42 may alternatively be mounted on the utility pole 30 adjacent (e.g., directly underneath) the metrocell antenna 20. The baseband unit 40 may receive data from another source such as, for example, a backhaul network (not shown) and may process this data and provide a data stream to the radio 42. The radio 42 may generate RF signals that include the data encoded therein and may amplify and deliver these RF signals to the metrocell antenna 20 for transmission via a cabling connection 44.

FIG. 2 is a perspective view of a known snap-around metrocell antenna 100 encircling a support structure 102 in the form of a utility pole. The metrocell antenna 100 has a generally cylindrical shape, and includes a central opening 108. The longitudinal axis of the cylinder defined by the metrocell antenna 100 and the central opening 108 will both extend in the vertical direction (i.e., perpendicular to a plane defined by the horizon) when the metrocell antenna 100 is mounted on the utility pole 102 for normal use. The snap-around metrocell antenna 100 includes first and second enclosures 104, 106 that can be attached together to capture the utility pole 102 therebetween so that the utility pole 102 extends through the central opening 108. Each enclosure 104, 106 may include a radome 110. The radome 110 may be substantially transparent to RF radiation in the operating frequency band(s) of the metrocell antenna 100 and may seal and protect internal components the metrocell antenna 100 from adverse environmental conditions.

SUMMARY OF THE INVENTION

As a first aspect, embodiments of the invention are directed to an antenna mounting assembly for a metrocell antenna. The antenna mounting assembly includes an upper bracket assembly and a lower bracket assembly. The upper bracket assembly includes a first bracket with a pair of apertures each having a convex tapered edge and a second bracket with a pair of pins extending upwardly therefrom. Each pin is configured to be received by a respective aperture of the first bracket to define an engagement point between the first and second brackets of the upper bracket assembly. The lower bracket assembly includes a first bracket having opposing flanged ends extending downwardly therefrom. Each flanged end of the first bracket includes an aperture. The lower bracket assembly also includes a second bracket having opposing flanged ends extending downwardly therefrom. Each flanged end of the second bracket includes an aperture. The flanged ends of the first bracket are configured to align with the flanged ends of the second bracket such that respective fasteners may be received through the aligned apertures to define an engagement point between the first and second brackets of the lower bracket assembly.

As a second aspect, embodiments of the invention are directed to a method of mounting a wrap-around metrocell antenna on a mounting pole with an antenna mounting assembly. The metrocell antenna includes a first antenna enclosure, a second antenna enclosure, and a third antenna enclosure. The antenna mounting assembly includes an upper bracket assembly and a lower bracket assembly. The upper bracket assembly includes a first bracket having a pair of apertures each having a convex tapered edge and a second bracket having a pair of pins extending upwardly therefrom. The lower bracket assembly includes a first bracket having opposing flanged ends extending downwardly therefrom and a second bracket having opposing flanged ends extending downwardly therefrom. The method includes (i) securing the first brackets of the upper and lower bracket assemblies to respective top and bottom ends of the first antenna enclosure and securing the second brackets of the upper and lower brackets to the respective tops and bottoms of the second and third antenna enclosures; (ii) securing the second bracket of the upper bracket assembly to the mounting pole with a clamping bracket; (iii) positioning the apertures of first bracket of the upper bracket assembly over respective pins and washers of the second bracket of the upper bracket assembly; (iv) lowering the first bracket of the upper bracket assembly onto the second bracket of the upper bracket assembly such that the pins and washers are received by the aligned apertures; (v) positioning the first bracket of the lower bracket assembly such that apertures in the flanged ends of the first bracket are aligned with the apertures in the flanged ends of the second bracket of the lower bracket assembly; and (vi) inserting fasteners through the aligned apertures of the first and second brackets of the lower bracket assembly.

As a third aspect, embodiments of the invention are directed to an antenna assembly. The antenna assembly includes an antenna, an antenna mounting assembly, and a clamping bracket. The antenna includes a first enclosure, a second enclosure, and a third enclosure. The antenna mounting assembly includes an upper bracket assembly and a lower bracket assembly. The upper bracket assembly includes a first bracket with a pair of apertures each having a convex tapered edge and a second bracket with a pair of pins extending upwardly therefrom. Each pin is configured to be received by a respective aperture of the first bracket to define an engagement point between the first and second brackets of the upper bracket assembly. The lower bracket assembly includes a first bracket having opposing flanged ends extending downwardly therefrom. Each flanged end of the first bracket includes an aperture. The lower bracket assembly further includes a second bracket having opposing flanged ends extending downwardly therefrom. Each flanged end of the second bracket includes an aperture. The flanged ends of the first bracket are configured to align with the flanged ends of the second bracket such that respective fasteners are received through the aligned apertures to define an engagement point between the first and second brackets of the lower bracket assembly. The clamping bracket is coupled to the second bracket of the upper bracket assembly of the antenna mounting assembly and includes a clamp member and a fastener. The first, second and third antenna enclosures are secured to the upper and lower bracket assemblies, and the clamping bracket secures the antenna mounting assembly to a mounting pole.

As a fourth aspect, embodiments of the invention are directed to a mounting assembly for an antenna and radio assembly. The mounting assembly includes and upper bracket assembly and a lower bracket assembly. The upper bracket assembly includes a first bracket member and a second bracket member. The first bracket member is configured to be secured to an antenna and the second bracket member is configured to be secured to a radio. The first bracket member is configured to be mounted to the second bracket member to secure an upper portion of the radio to the antenna. The lower bracket assembly includes a first bracket member and a second bracket member. The first bracket member is configured to engage with the radio and the second bracket member is configured to be secured to the antenna. The first bracket member is configured to engage with the second bracket member via a pair of locking mechanisms to secure a lower portion of the radio to the antenna.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim and/or file any new claim, accordingly, including the right to be able to amend any originally filed claim to depend from and/or incorporate any feature of any other claim or claims although not originally claimed in that manner. These and other objects and/or aspects of the present invention are explained in detail in the specification set forth below. Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF THE INVENTION

Figure 1:
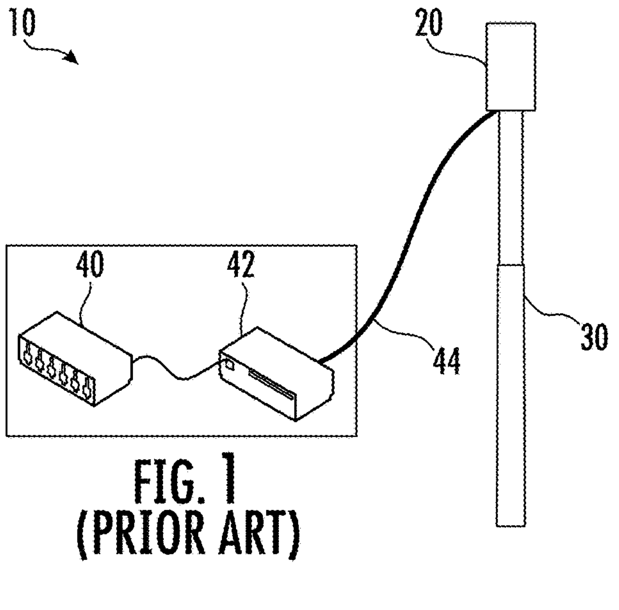
FIG. 1 (PRIOR ART)
FIG. 1 is a schematic view of a conventional metrocell base station.
Figure 2:
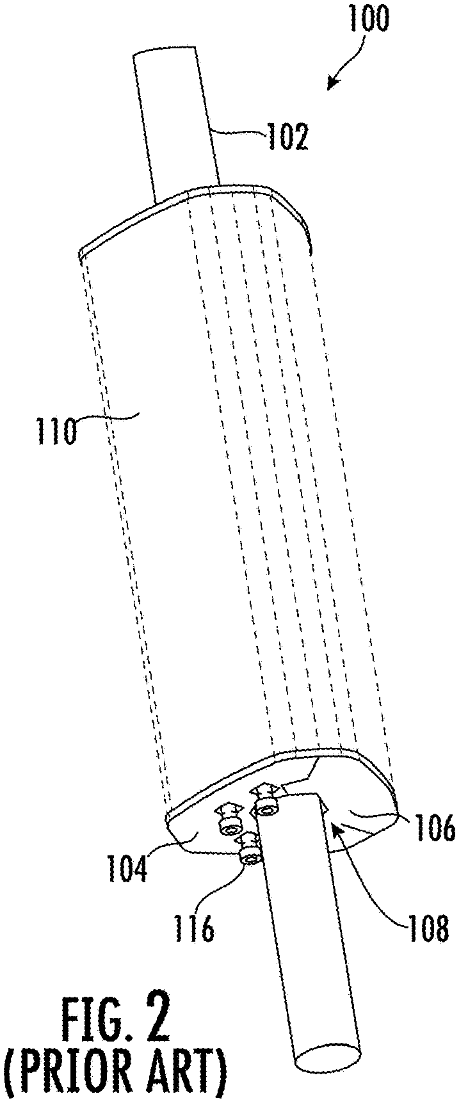
FIG. 2 (PRIOR ART)
FIG. 2 is a perspective view of an exemplary known snap-around metrocell antenna encircling a support structure in the form of a utility pole.

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the below description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Embodiments of the present invention are directed to antenna mount assemblies for metrocell antennas. The antenna mount assemblies may provide for easier and more efficient installation and removal of metrocell antenna assemblies and/or antenna-radio assemblies. Embodiments of the present invention will now be described in further detail below with reference to FIGS. 3A-13C.

Referring now to FIGS. 3A-3C, FIGS. 4A-4B, FIGS. 5A-5C, FIGS. 6A-6B and FIGS. 7A-7B, an antenna assembly 200 according to embodiments of the present invention is illustrated. In some embodiments, the antenna assembly 200 may comprise a metrocell antenna 210 mounted on a mounting structure such as a utility pole 102. In some embodiments, the metrocell antenna may be a wrap-around or snap-around metrocell antenna 210. The metrocell antenna 210 of the antenna assembly 200 of the present invention may comprise first, second, and third enclosures 204, 206, 208 (see, e.g., FIG. 3C for third enclosure) that can be coupled together to capture the utility pole 102 therebetween so that the utility pole 102 extends through a central opening 207 (see, e.g., FIG. 3C, FIG. 4A, and FIG. 5B). Each enclosure 204, 206, 208 may include a radome 220. The radome 220 may be substantially transparent to RF radiation in the operating frequency band(s) of the metrocell antenna 210 and may seal and protect internal components the metrocell antenna 210 from adverse environmental conditions.

Figure 3A:
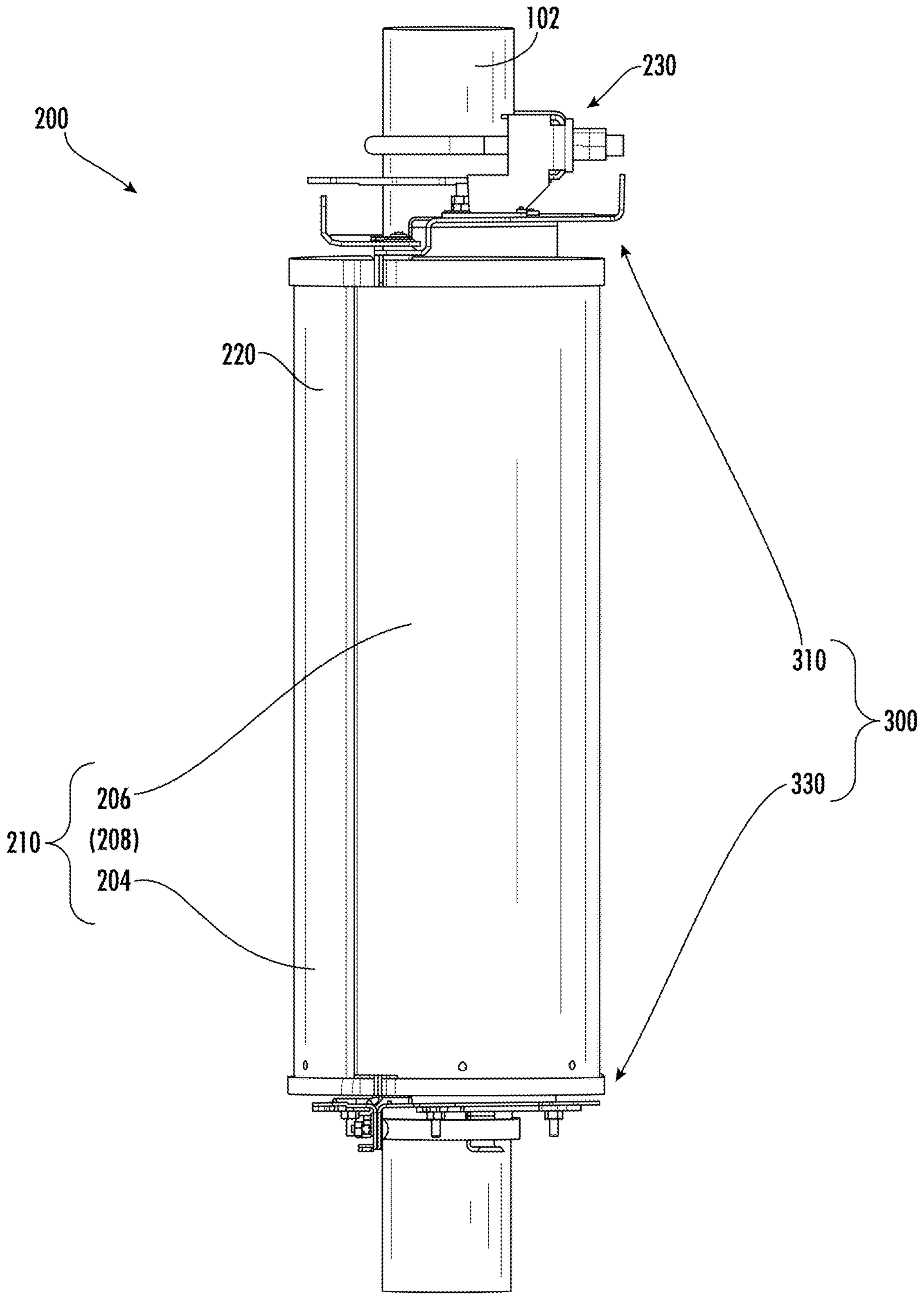
FIG. 3A is a side view of an antenna assembly utilizing an antenna mount assembly according to embodiments of the present invention.

As further shown in FIGS. 3A-3C, FIGS. 4A-4C, FIGS. 5A-5B and FIGS. 6A-6B, in some embodiments, the antenna assembly 200 may utilize an antenna mounting assembly 300 to help install (and remove) the enclosures 204, 206, 208 of the metrocell antenna 210 on the utility pole 102. In some embodiments, as shown in FIG. 3A, the antenna mounting assembly 300 of the present invention may comprise an upper bracket assembly 310 and a lower bracket assembly 330. The upper bracket assembly 310 is shown in greater detail in FIGS. 3B-3C and FIGS. 4A-4B.

As shown in FIGS. 3B-3C and FIGS. 4A-4B, the upper bracket assembly 310 comprises a first bracket 312 and a second bracket 314. The first and second brackets 312, 314 are configured to be removably coupled together at a pair of engagement points 320. In some embodiments, the first bracket 312 is configured such that one of the antenna enclosures 204 may be secured thereto and the second bracket 314 is configured such that the other two antenna enclosures 206, 208 may be secured thereto.

Figure 4A:
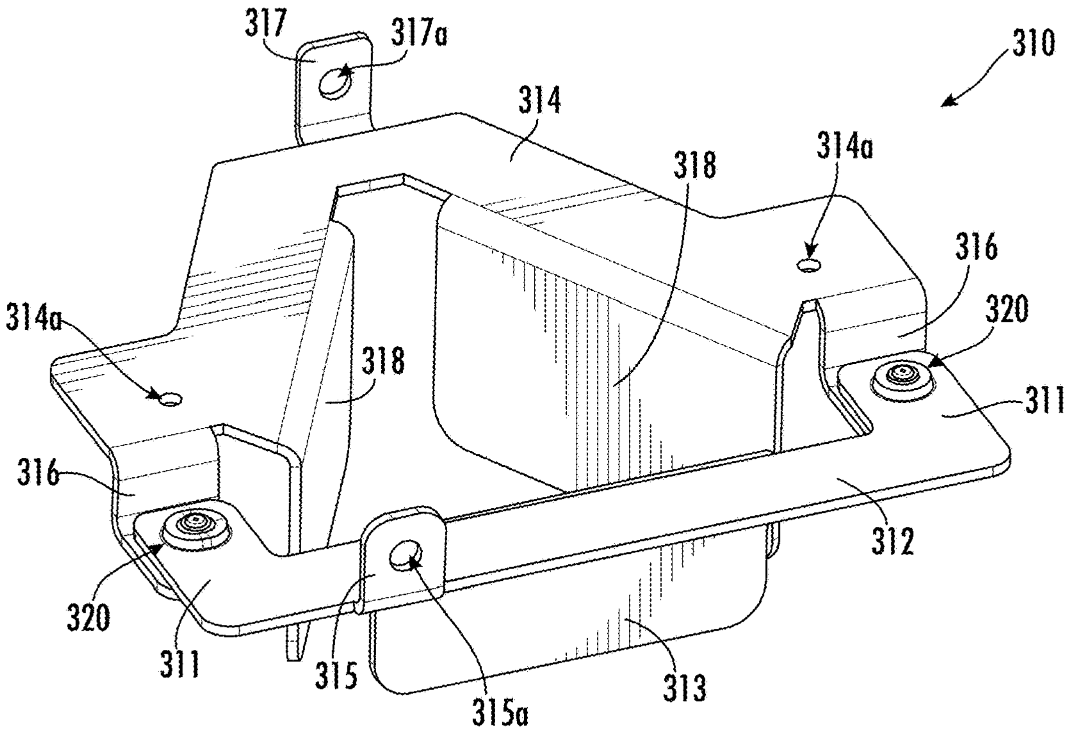
FIG. 4A is a perspective view of the upper bracket assembly for the antenna mount assembly according to embodiments of the present invention.
Figure 4B:
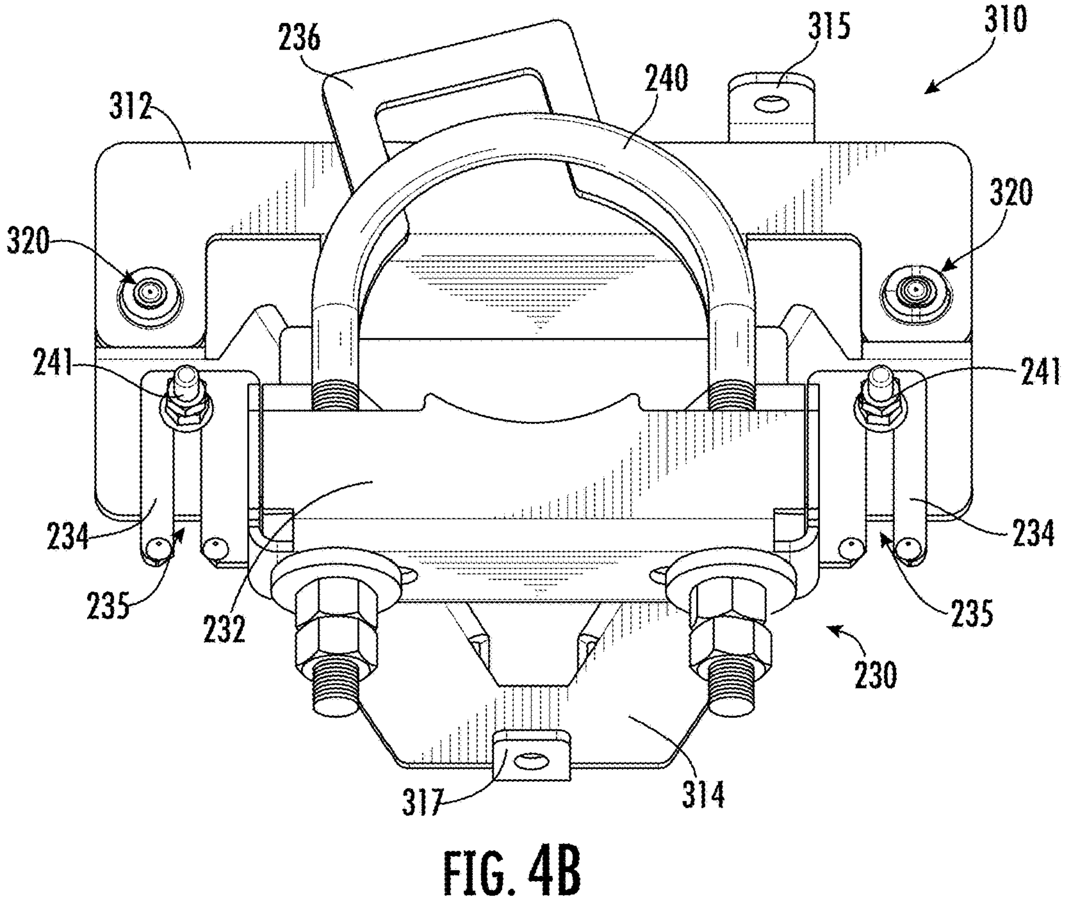
FIG. 4B illustrates an exemplary clamping bracket secured to the upper bracket assembly of FIG. 4A according to embodiments of the present invention.

As shown in FIGS. 4A-4B, in some embodiments, the first bracket 312 of the upper bracket assembly 310 may generally have a C-shape with opposing flanged ends 311. As described in further detail below, each flanged end 311 comprises an aperture 322*a* having a convex tapered edge 322 which forms part of the engagement point 320 between the first and second brackets 312, 314 (see, e.g., FIG. 5C). The first bracket 312 may comprise a mounting plate 313 that extends downwardly therefrom. The mounting plate 313 may be configured to have one of the antenna enclosures 204 secured thereto. In some embodiments, the first bracket 312 may further comprise a hoisting member 315 extending upwardly therefrom which provides a location for an installer to secure a hoisting device (e.g., cable, rope, or the like) to the first bracket 312 such that the antenna enclosure 204 may be lifted for installation on the utility pole 102. For example, in some embodiments, the hoisting member 315 may comprise an aperture 315*a* configured to receive the hoisting device.

In some embodiments, the second bracket 314 of the upper bracket assembly 310 may generally have a V-shape with opposing flanged ends 316. As described in further detail below, each flanged end 316 comprises a pin or rod 326 extending upwardly therefrom which form another part of the engagement points 320 between the first and second brackets 312, 314 (i.e., the pins 326 are configured to be received by a respective aperture 322*a* of the first bracket 312) (see, e.g., FIG. 5C). In some embodiments, the second bracket 314 may comprise two mounting plates 318 extending downwardly therefrom. Each mounting plate 318 may be configured to have a respective antenna enclosure 206, 208 secured thereto. In some embodiments, the second bracket 314 may further comprise a hoisting member 317 extending upwardly therefrom. Similar to the hoisting member 315 of the first bracket 312, the hoisting member 317 of the second bracket 314 may provide a location (e.g., via aperture 317*a*) for an installer to secure a hoisting device (e.g., cable, rope, or the like) to the second bracket 314 such that the antenna enclosures 206, 208 may be lifted for installation on the utility pole 102.

Figure 3B:
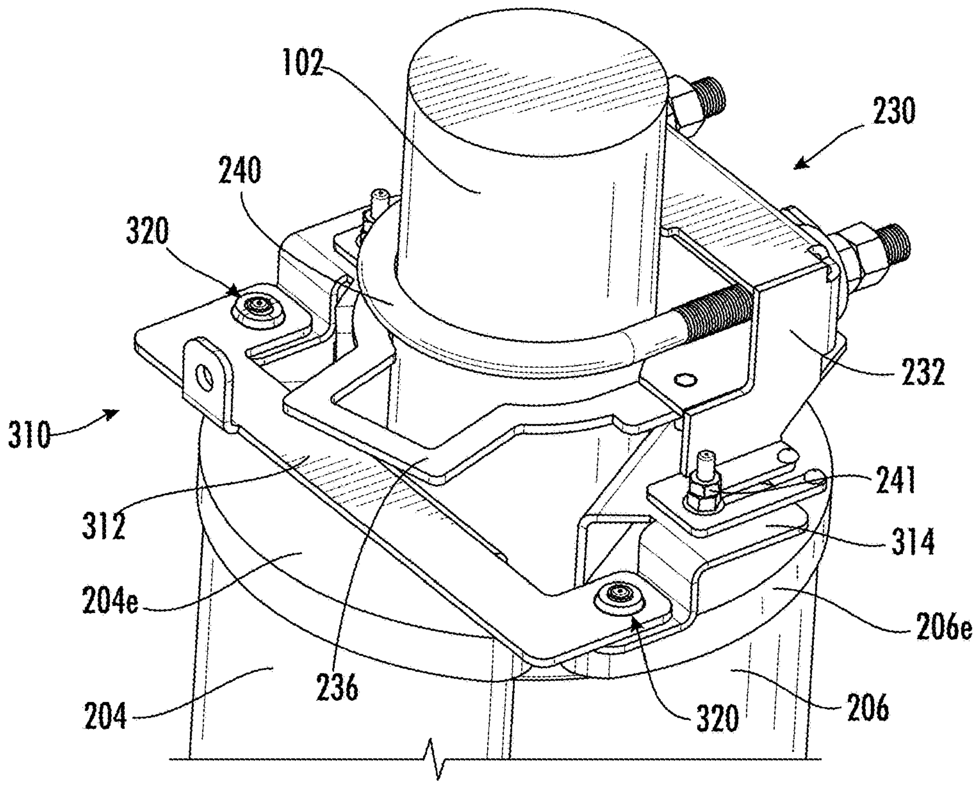
FIG. 3B is a partial top perspective view of the antenna assembly of FIG. 3A illustrating an upper bracket assembly of the antenna mount assembly according to embodiments of the present invention.
Figure 3C:
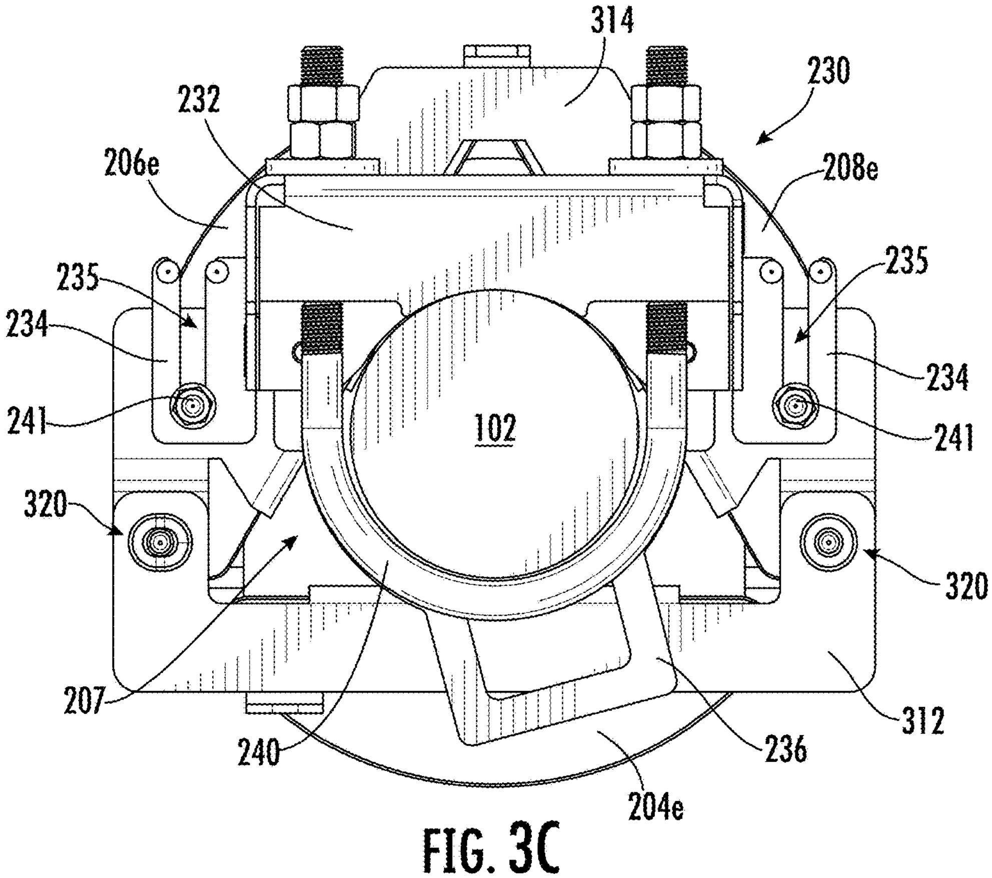
FIG. 3C is a top view of the antenna assembly of FIG. 3A.

As shown in FIGS. 3B-3C and FIG. 4B, in some embodiments, the second bracket 314 is configured to have a clamping bracket 230 secured thereto. The clamping bracket 230 is configured to secure the antenna mounting assembly 300 (and the enclosures 204, 206, 208 of the metrocell antenna 210 secured thereto) to the mounting structure (e.g., utility pole 102). In some embodiments, the second bracket 314 may comprise one or more apertures 314*a* configured to receive a respective fastener 241 from the clamping bracket 230. As further shown in FIGS. 3B-3C and FIG. 4B, in some embodiments, the clamping bracket 230 includes a clamp member 232 and a fastener 240 (e.g., a U-bolt) that can be secured together to capture the utility pole 102 therebetween. The clamp member 232 may comprise opposing flange edges 234 having open-ended slots 235. As described in further detail below, during installation of the antenna 210 on a mounting structure 102, the open-end slots 235 are configured to receive a respective fastener 241 which has been secured to the second bracket 314 (see also, e.g., FIG. 3C and FIG. 4B). In some embodiments, the clamping bracket 230 may further comprise a support member 236 that provides additional securement of the clamping bracket 230 with the utility pole 102.

Figure 5A:
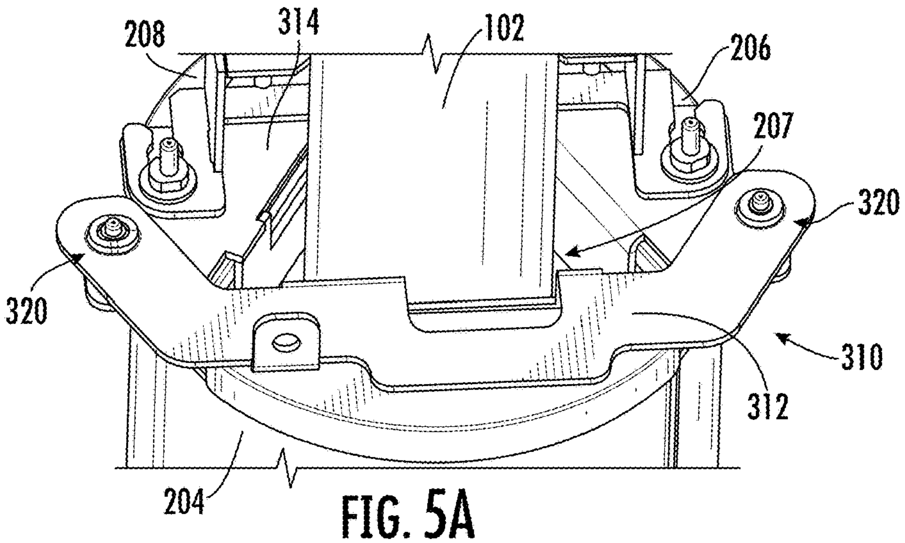
FIG. 5A is another partial top perspective view of the of the antenna assembly of FIG. 3A illustrating the upper bracket of the antenna mount assembly according to embodiments of the present invention.
Figure 5B:
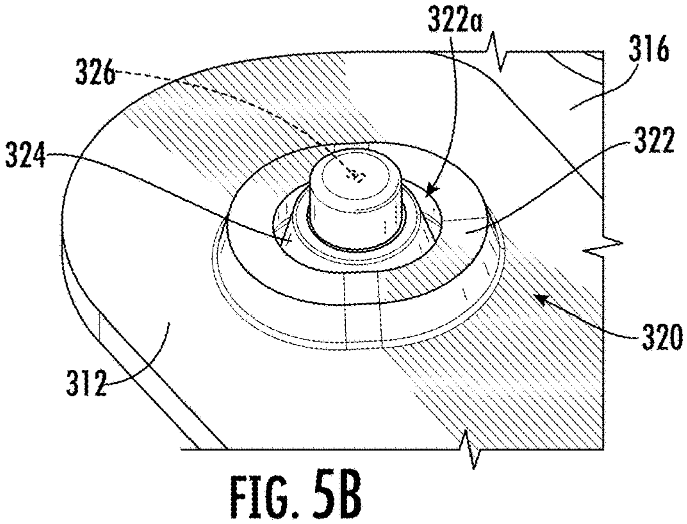
FIG. 5B is an enlarged view of an engagement point of the upper bracket assembly of the antenna mount assembly according to embodiments of the present invention.
Figure 5C:
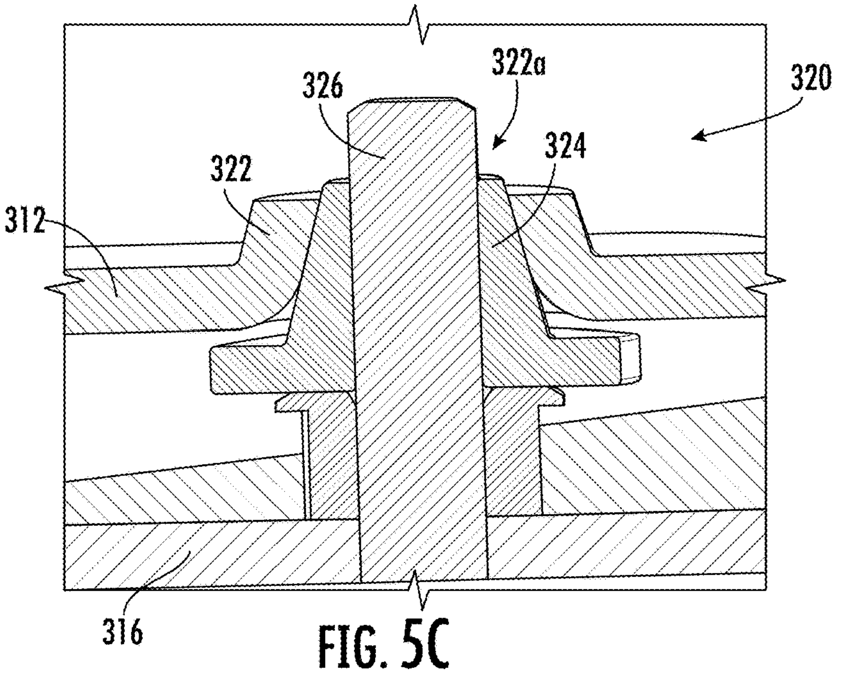
FIG. 5C is a side cross-sectional view of the engagement point of the upper bracket assembly of the antenna mount assembly according to embodiments of the present invention.

Referring to FIGS. 5A-5C, the engagement points 320 of the upper bracket assembly 310 (i.e., between the first and second brackets 312, 314) are illustrated in greater detail. As noted above, in some embodiments, each flanged end 316 of the second bracket 314 comprises a pin or rod 326 extending upwardly therefrom. As shown in FIG. 5C, in some embodiments, the pin 326 extends through a tapered washer 324. In some embodiments, the tapered washer 324 may be tapered at an angle of between about 3 degrees and about 15 degrees. As further noted above, in some embodiments, each flanged end 311 of the first bracket 312 comprises an aperture 322*a* having a convex tapered edge 322.

During installation, the first bracket 312 is secured to one of the antenna enclosures 204 and the second bracket 314 is secured to other two antenna enclosures 206, 208. The first and second brackets 312, 314 are positioned such that the apertures 322*a* of the first bracket 312 are aligned with the pins 326 of the second bracket 314, and the first bracket 312 is lowered onto the second bracket 314 such that the pins 326 are received within a respective aperture 322*a* (i.e., engagement points 320 between the first and second brackets 312, 314) (see also, e.g., FIGS. 9A-9D). In some embodiments, the tapered edges 322 of the apertures 322*a* of the first bracket 312 correspond with the tapered edges of the washers 324 (positioned on the pins 326 of the second bracket 314) to help guide the first bracket 312 onto the second bracket 314 and form a firm connection (engagement point 320) between the first and second brackets 312, 314.

In some embodiments, one of the apertures 322*a* of the first bracket 312 may have a generally round shape and the other aperture 322*a* of the first bracket 312 may have a generally oval or oblong shape. The round aperture 322*a* may be used to help position the first bracket 312 onto one of the pins 326 of the second bracket 314. The oval or oblong aperture 322*a* may then be positioned to receive the other pin 326 of the second bracket 314 with the oval or oblong shape of the aperture 322*a* helping to absorb tolerances (variances) in the location of the second pin 326 of the second bracket 314 relative to the first pin 326.

Referring now to FIGS. 6A-6B, FIGS. 7A-7B and FIGS. 8A-8B, the lower bracket assembly 330 of the antenna mounting assembly 300 is shown in greater detail. Similar to the upper bracket assembly 310 of the antenna mounting assembly 300, the lower bracket assembly 330 comprises a first bracket 332 and a second bracket 334. The first and second brackets 332, 334 are configured to be removably coupled together at a pair of engagement points 350. In some embodiments, the first bracket 332 is configured such that one of the antenna enclosures 204 may be secured thereto and the second bracket 334 is configured such that the other two antenna enclosures 206, 208 may be secured thereto.

Figure 6A:
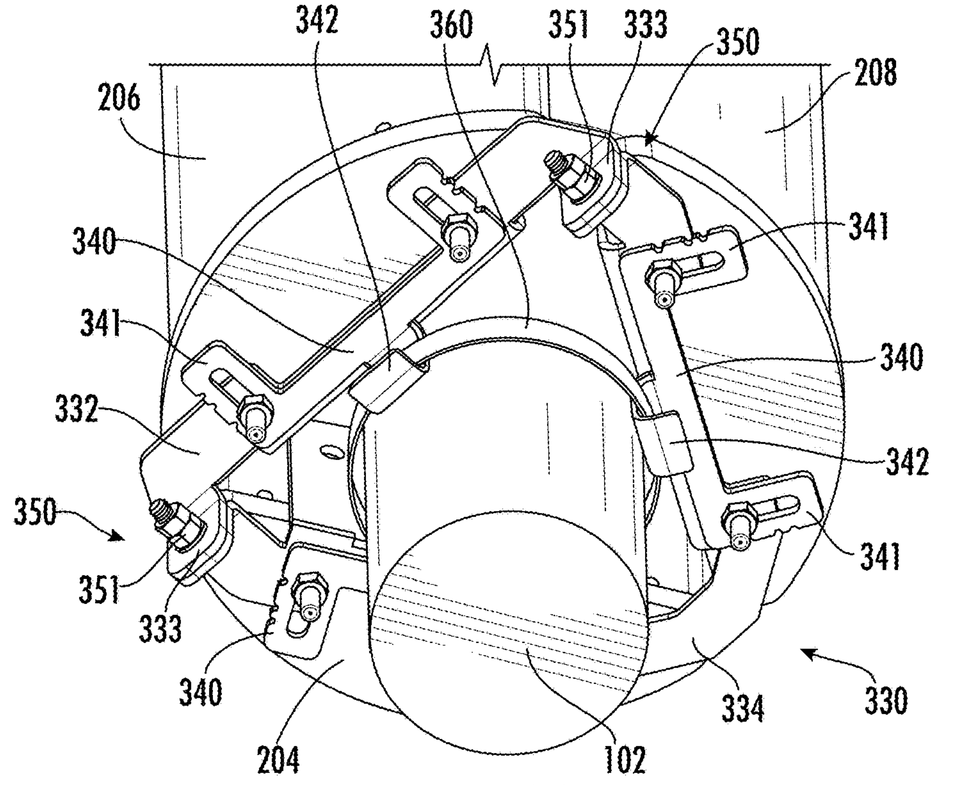
FIG. 6A is a partial bottom perspective view of the antenna assembly of FIG. 3A illustrating a bottom bracket assembly of the antenna mount assembly according to embodiments of the present invention.
Figure 6B:
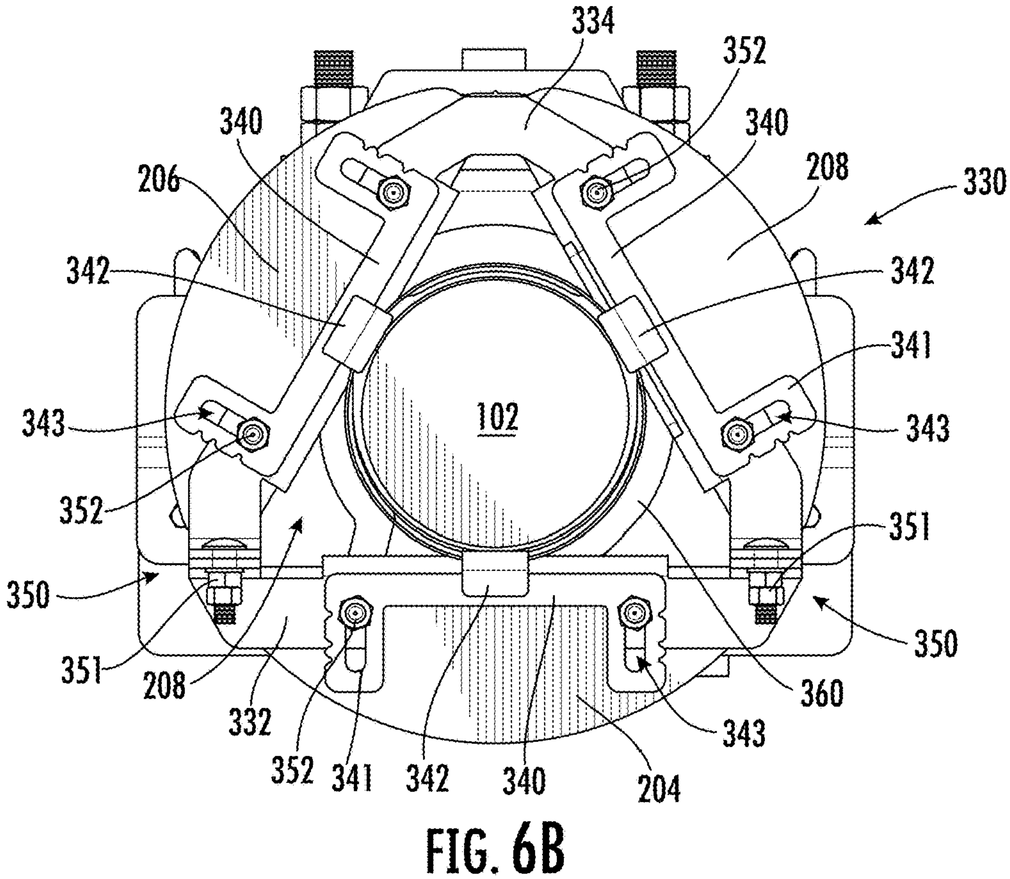
FIG. 6B is a bottom view of the antenna assembly of FIG. 3A.
Figure 7A:
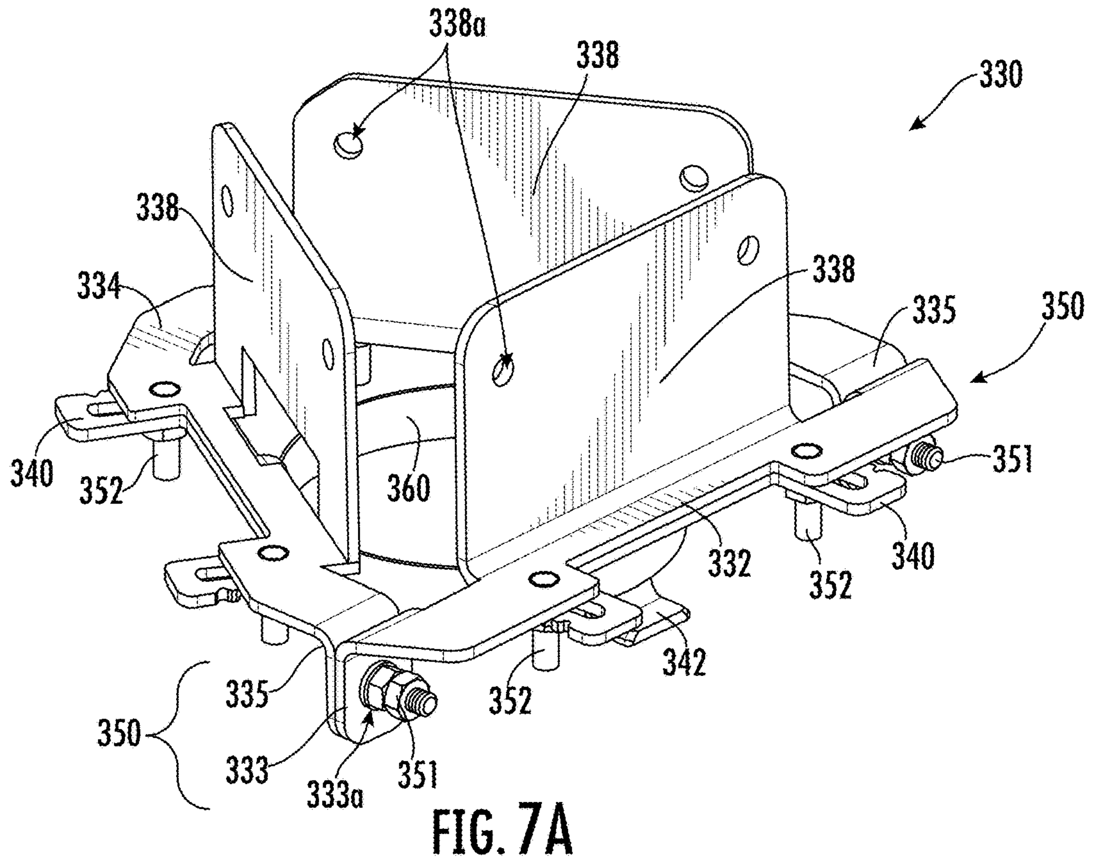
FIG. 7A is a perspective view of the bottom bracket assembly of the antenna mount assembly according to embodiments of the present invention.
Figure 7B:
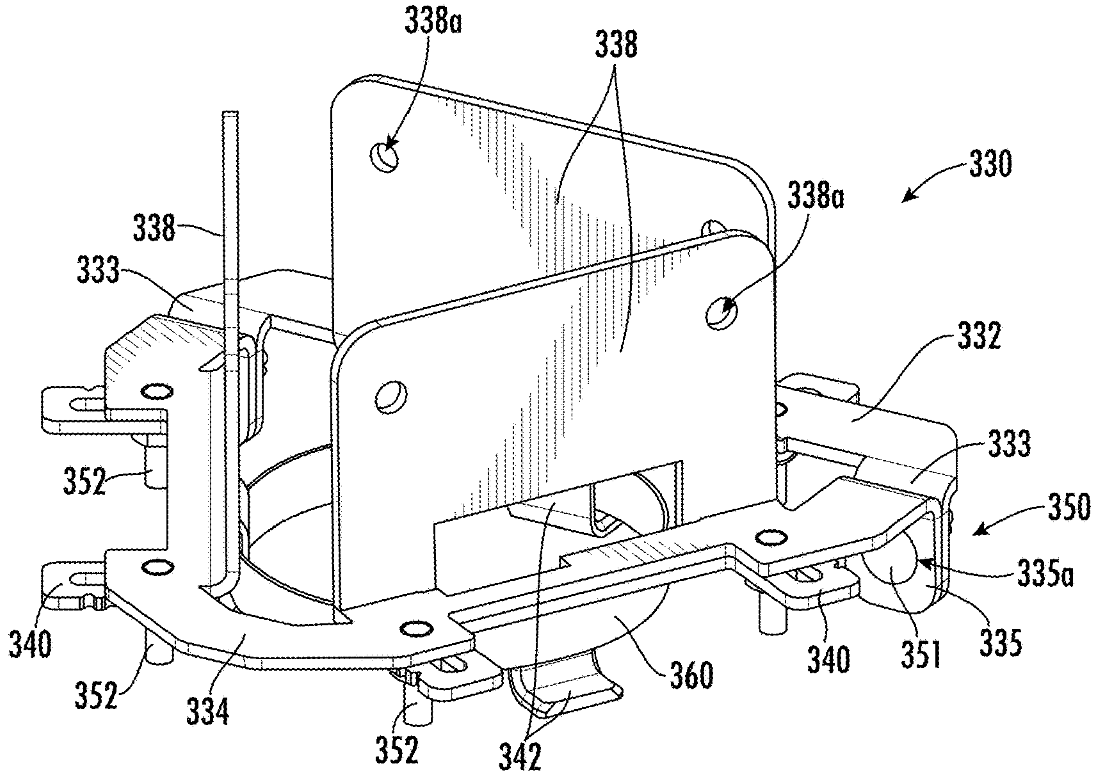
FIG. 7B is another perspective view of the bottom bracket assembly of FIG. 7A.
Figure 8A:
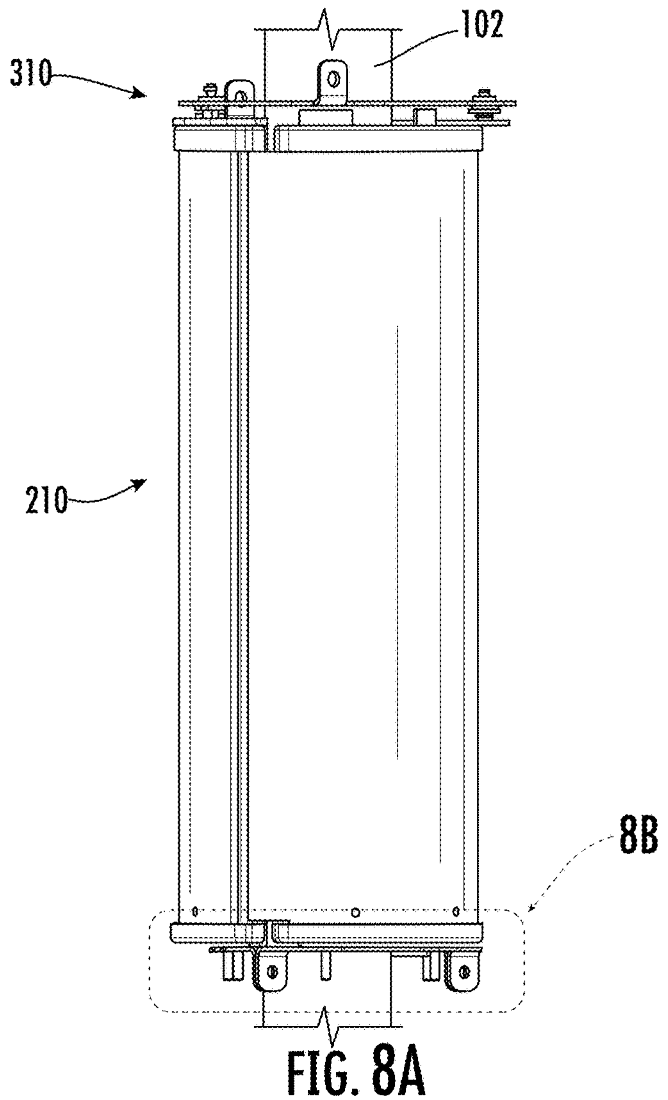
FIG. 8A is a side view of the antenna assembly of FIG. 3A.
Figure 8B:
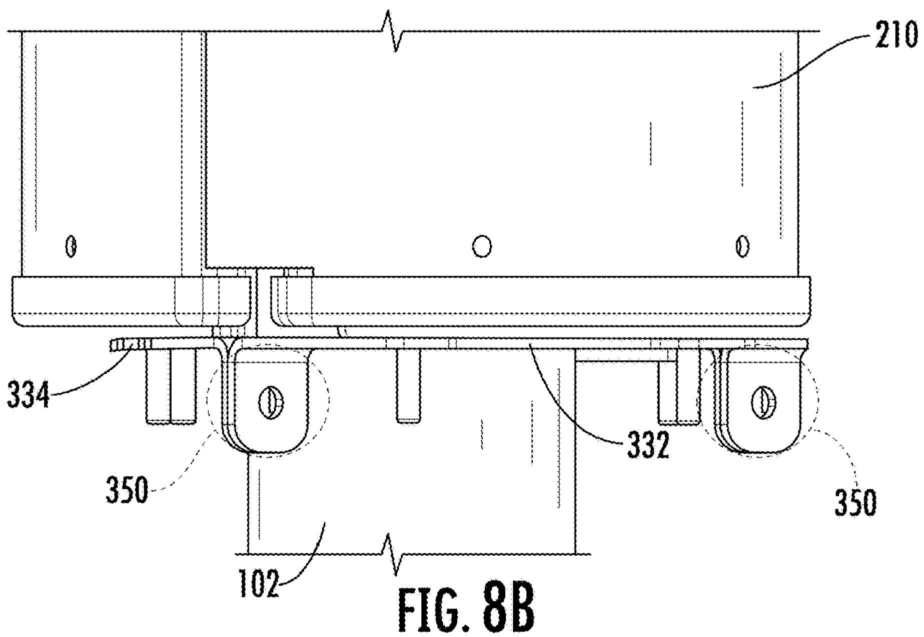
FIG. 8B is an enlarged side view of a bottom bracket assembly for the antenna mount assembly.

As shown in FIG. 6A and FIGS. 7A-7B, in some embodiments, the first bracket 332 of the lower bracket assembly 330 comprises opposing downwardly extending flanged ends 333 which forms part of the engagement point 350 between the first and second brackets 332, 334 (see also, e.g., FIG. 8B). As described in further detail below, each flanged end 333 comprises an aperture 333*a* configured to receive a fastener 351 therethrough to secure the first bracket 332 to the second bracket 334 of the lower bracket assembly 330 (see, e.g., FIG. 7A). In some embodiments, the first bracket 332 of the lower bracket assembly 330 may comprise a mounting plate 338 that extends upwardly therefrom. The mounting plate 338 may be configured to have one of the antenna enclosures 204 secured thereto (e.g., via mounting apertures 338*a*).

In some embodiments, the second bracket 334 of the lower bracket assembly 330 may generally have a V-shape with opposing downwardly extending flanged ends 335. As described in further detail below, each flanged end 335 comprises an aperture 335*a* configured to receive a fastener 351 therethrough to secure the second bracket 334 to the first bracket 332 of the lower bracket assembly 330 (see, e.g., FIG. 7A) (i.e., the apertures 333*a* in the flanged ends 333 of the first bracket 332 align with the apertures 335*a* in the flanged ends 335 of the second bracket 334 to receive respective fasteners 351 therethrough to form the engagement points 350 of the lower bracket assembly 330). In some embodiments, the second bracket 334 may comprise two mounting plates 338 extending upwardly therefrom. Each mounting plate 338 may be configured to have a respective antenna enclosure 206, 208 secured thereto.

As shown in FIGS. 6A-6B and FIGS. 7A-7B, in some embodiments, the lower bracket assembly 330 may comprise a plurality of sliding members 340 coupled to the first and second brackets 332, 334. For example, in some embodiments, one sliding member 340 is coupled to the first bracket 332 and two sliding members 340 are coupled to the second bracket 334. In some embodiments, each sliding member 340 comprises opposing flanged ends 341 extending outwardly therefrom. Each flanged end 341 comprises a slot 343. The slots 343 are configured to receive a respective fastener 352 extending downwardly from the first and second brackets 332, 334. The fasteners 352 are configured to traverse (slide) within the slots 343, thereby allowing the sliding members 340 to move back-and-forth in a radially direction relative to the respective brackets 332, 334 and mounting structure 102.

As further shown in FIGS. 6A-6B and FIGS. 7A-7B, the sliding members 340 each comprise a latching member 342 extending downwardly therefrom. In some embodiments, the latching members 342 are configured to engage a metal ring 360 positioned around the mounting structure 102 (see, e.g., FIGS. 6A-6B). In some embodiments, the sliding members 340 are moved radially inwardly relative to the first and second brackets 332, 334 to pull the bottom of the antenna enclosures 204, 206, 208 toward the mounting structure 102 and the latching members 342 are engaged with the metal ring 360 to secure the bottom of the antenna enclosures 204, 206, 208 adjacent to the mounting structure 102. In some embodiments, engagement of the latching members 342 with the metal ring 360 help to prevent movement of the bottom of the antenna 210 (e.g., movement of the antenna 210 away from the mounting structure 102).

As noted above, and shown in FIGS. 8A-8B, the apertures 333*a* in the flanged ends 333 of the first bracket 332 align with the apertures 335*a* in the flanged ends 335 of the second bracket 334 such that respective fasteners 351 may be received therethrough to form the engagement points 350 of the lower bracket assembly 330 and secure the first bracket 332 to the second bracket 334.

Referring now to FIGS. 9A-9D, the operation of installing a metrocell antenna 210 mounted on a mounting structure such as a utility pole 102 utilizing the antenna mounting assembly 300 described herein according to embodiments of the present invention is illustrated. First, the first brackets 312, 332 of the upper and lower bracket assemblies 310, 330 are secured to the respective top and bottom ends of one of the antenna enclosures 204 and the second brackets 314, 334 of the upper and lower brackets 310, 330 are secured to the respective tops and bottoms of the other two antenna enclosures 206, 208. Next, the second bracket 314 of the upper bracket assembly 310 (and attached antenna enclosures 206, 208) is secured to the mounting structure 102 (for example, via the clamping bracket 230 as described herein, see also FIG. 10A). It is noted that the clamping bracket 230 has been hidden from view in FIGS. 9A-9C to allow for a clearer illustration of the interaction of the first and second brackets 312, 314 during installation of the upper bracket assembly 310 on the mounting structure 102.

Figure 9A:
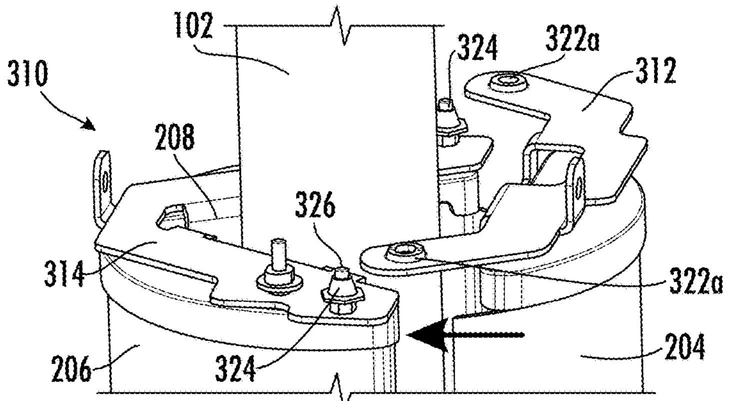
FIGS. 9A-9D illustrate the operation of installing a wrap-around metrocell antenna utilizing the antenna mount assembly of FIG. 3A according to embodiments of the present invention.
Figure 9B:
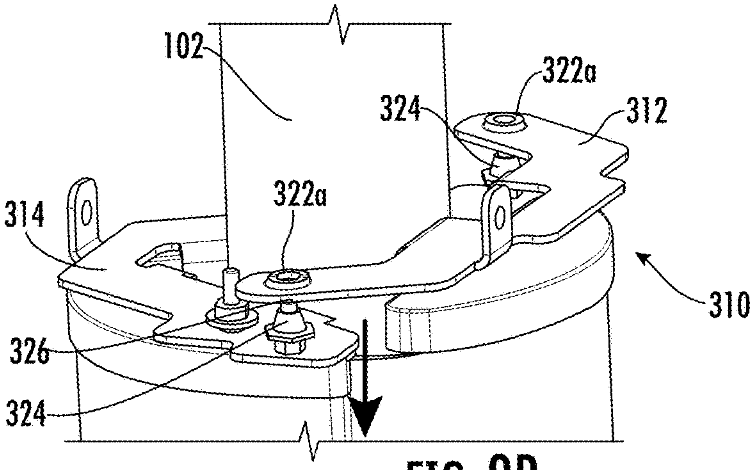
Figure 9C:
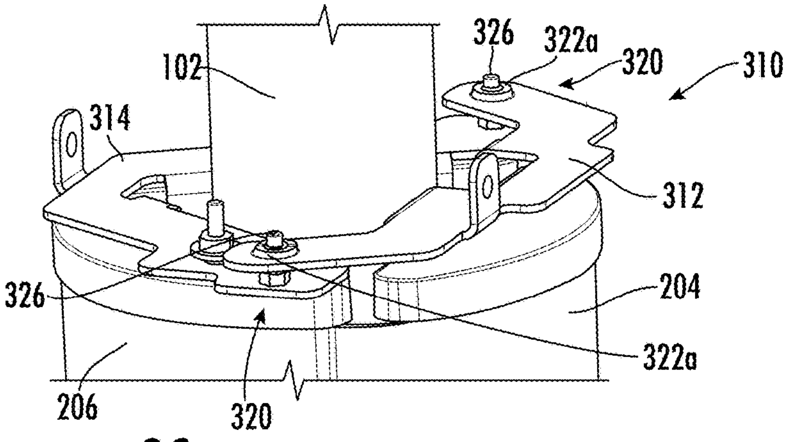

As shown in FIG. 9A, next the first bracket 312 (and attached antenna enclosure 204) is moved toward the second bracket 314 (as indicated by the arrow) until the apertures 322*a* of the first bracket 312 are positioned over respective pins 326 and washers 324 of the second bracket 314. As shown in FIGS. 9B-9C, the first bracket 312 is then lowered onto the second bracket 314 (as indicated by the arrow) such that the pins and washers 326, 324 of the second bracket 314 are received by the aligned apertures 322*a* of the first bracket 312, thereby forming the engagement points 320 of the upper bracket assembly 310. The engagement points 320 form a firm connection between the first and second brackets 312, 314 of the upper bracket assembly 310 (e.g., through gravity and the weight of the antenna enclosures 204, 206, 208).

Figure 9D:
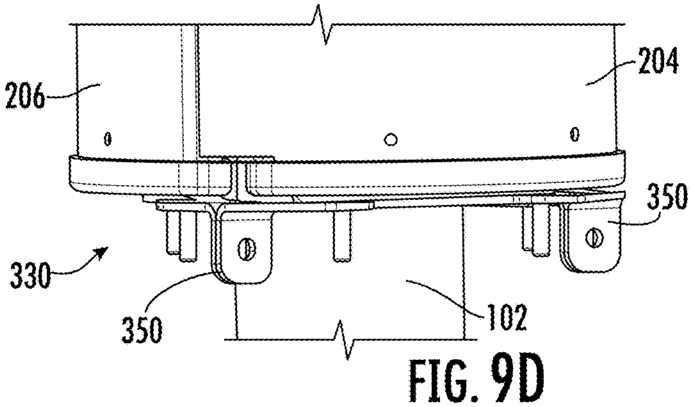

As shown in FIG. 9D, to complete the installation, the first bracket 332 of the lower bracket assembly 330 is moved toward the second bracket 334 of the lower bracket assembly 330 and positioned such that the apertures 333*a* in the flanged ends 333 of the first bracket 332 are aligned with the apertures 335*a* in the flanged ends 335 of the second bracket 334, thereby forming the engagement points 350 of the lower bracket assembly 330. Respective fasteners 351 are then inserted through the aligned apertures 333*a*, 335*a* to secure the bottom of the antenna enclosures 204, 206, 208 adjacent to the mounting structure 102. While not shown in FIG. 9D, as described herein, in some embodiments, securement of the lower bracket assembly 310 may further comprise engagement of latching members 342 of the sliding members 340 with a metal ring 360, to further secure the bottom of the antenna enclosures 204, 206, 208 adjacent to the mounting structure 102.

Figure 10A:
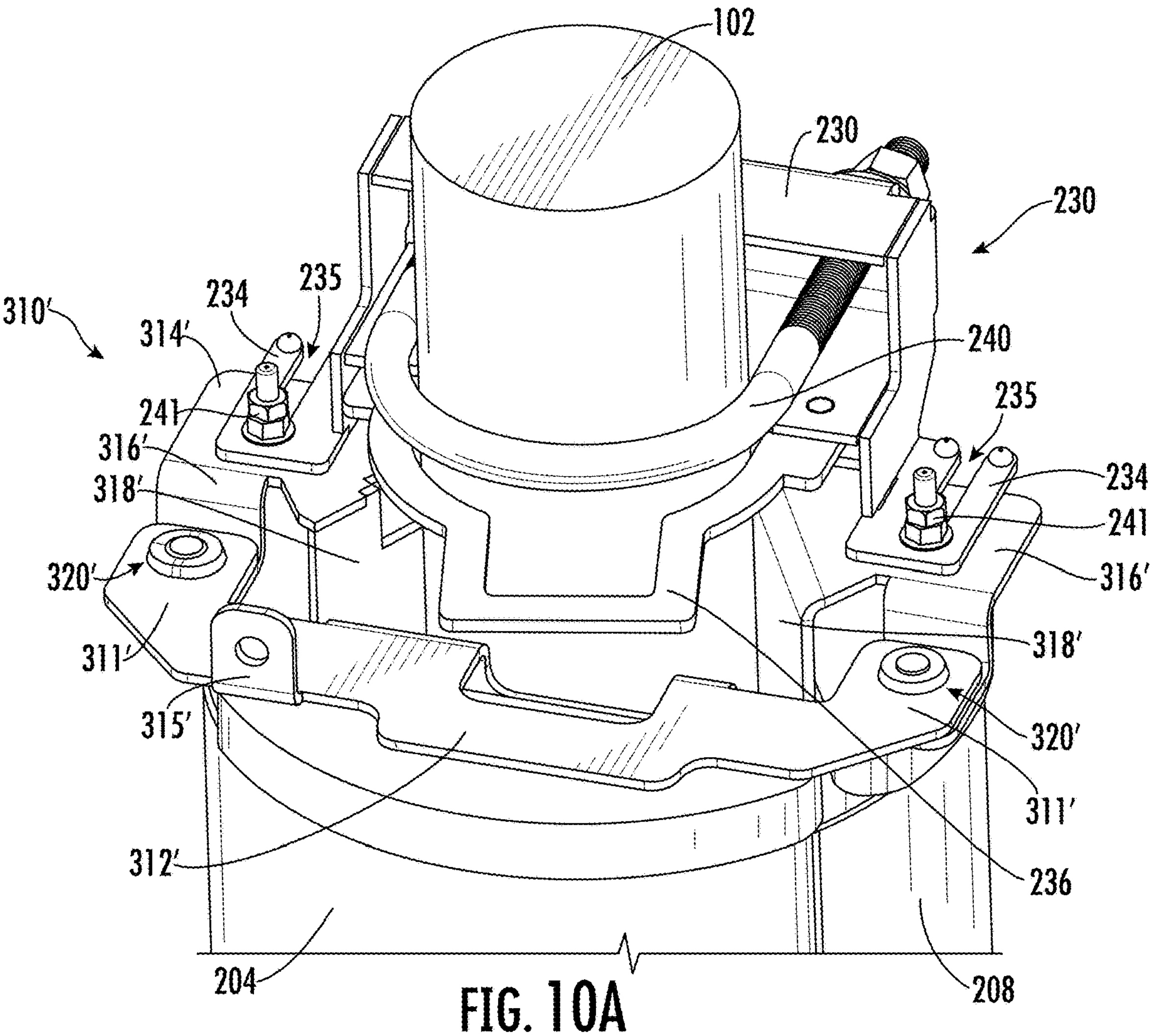
FIG. 10A is a top perspective view of an alternative upper bracket assembly for the antenna mount assembly of FIG. 3A according to embodiments of the present invention.
Figure 10B:
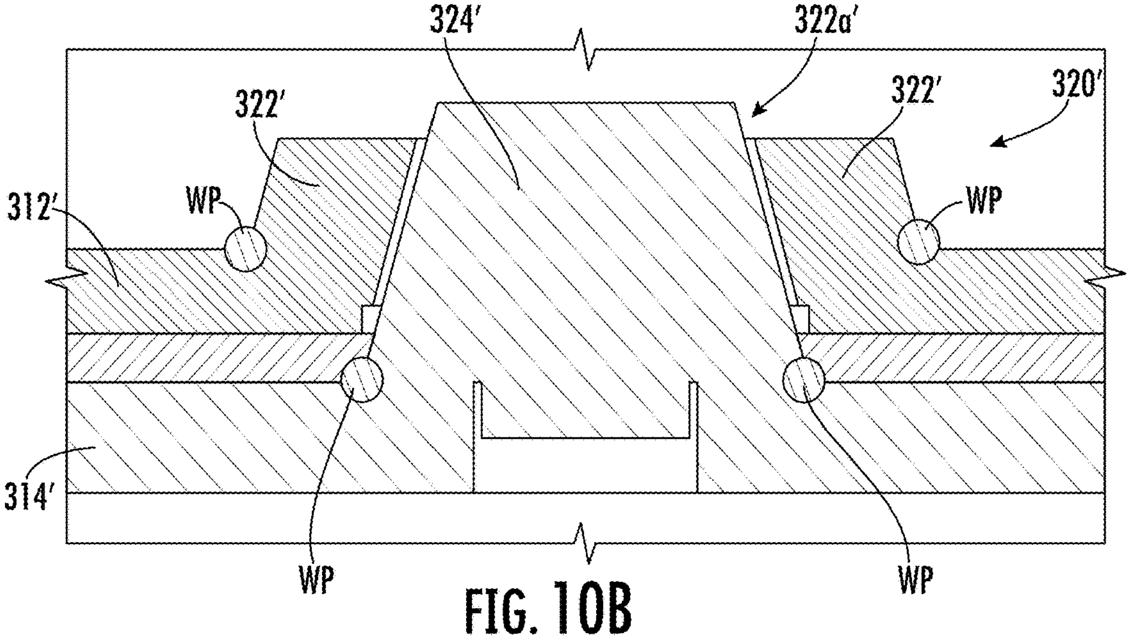
FIG. 10B is a side cross-sectional view of an engagement point of the alternative upper bracket assembly of FIG. 10A according to embodiments of the present invention.

Referring to FIGS. 10A-10B, an upper bracket assembly 310' having an alternative configuration of the engagement points 320' according to embodiments of the present invention is illustrated. Properties and/or features of the upper bracket assembly 310' may be as described above in reference to the upper bracket assembly 310 described herein and duplicate discussion thereof may be omitted herein for the purposes of discussing FIGS. 10A-10B.

As shown in FIG. 10A, the upper bracket assembly 310' comprises a first bracket 312' and a second bracket 314'. The first and second brackets 312', 314' are configured to be coupled together at a pair of engagement points 320'. In some embodiments, the first bracket 312' is configured such that one of the antenna enclosures 204 may be secured thereto and the second bracket 314' is configured such that the other two antenna enclosures 206, 208 may be secured thereto. In some embodiments, the first bracket 312' of the upper bracket assembly 310' has opposing flanged ends 311. The first bracket 312' may comprise a mounting plate (not shown) that extends downwardly therefrom and is configured to have one of the antenna enclosures 204 secured thereto. In some embodiments, the first bracket 312' may further comprise a hoisting member 315' extending upwardly therefrom which provides a location for an installer to secure a hoisting device (e.g., cable, rope, or the like) to the first bracket 312' such that the antenna enclosure 204 may be lifted for installation on the utility pole 102.

As further shown in FIG. 10A, in some embodiments, the second bracket 314' of the upper bracket assembly 310' may generally have a V-shape with opposing flanged ends 316'. In some embodiments, the second bracket 314' may comprise two mounting plates 318' extending downwardly therefrom and configured to have a respective antenna enclosure 206, 208 secured thereto. In some embodiments, the second bracket 314' is configured to have a clamping bracket 230 secured thereto. The clamping bracket 230 is configured to secure the antenna mounting assembly 300 (and the enclosures 204, 206, 208 of the metrocell antenna 210 secured thereto) to the mounting structure (e.g., utility pole 102). In some embodiments, the clamping bracket 230 includes a clamp member 232 and a fastener 240 (e.g., a U-bolt) that can be secured together to capture the utility pole 102 therebetween. The clamp member 232 may comprise opposing flange edges 234 having open-ended slots 235. In some embodiments, the clamping bracket 230 may further comprise a support member 236 that provides additional securement of the clamping bracket 230 with the utility pole 102.

As noted above, the upper bracket assembly 310' differs from the upper bracket assembly 310 described herein in that the upper bracket assembly 310 has an alternative configuration of the engagement points 320'. In FIG. 10B, the alternative engagement point 320' of the upper bracket assembly 310' (i.e., between the first and second brackets 312', 314') is illustrated in greater detail. As shown in FIG. 10B, the pin 326 and tapered washer 324 of the engagement points 320 for upper bracket assembly 310 described herein may be replaced with steel taper bushings 322', 324'. The respective steel taper bushings 322', 324' are welded to the first and second brackets 312', 314' at weld points WP. During installation, the taper bushing 324' that is welded to the second bracket 314' is received through an opening 322*a*' formed between the taper bushings 322' that are welded to the first bracket 312' in a similar manner described herein with respect to upper bracket assembly 310.

Figure 11A:
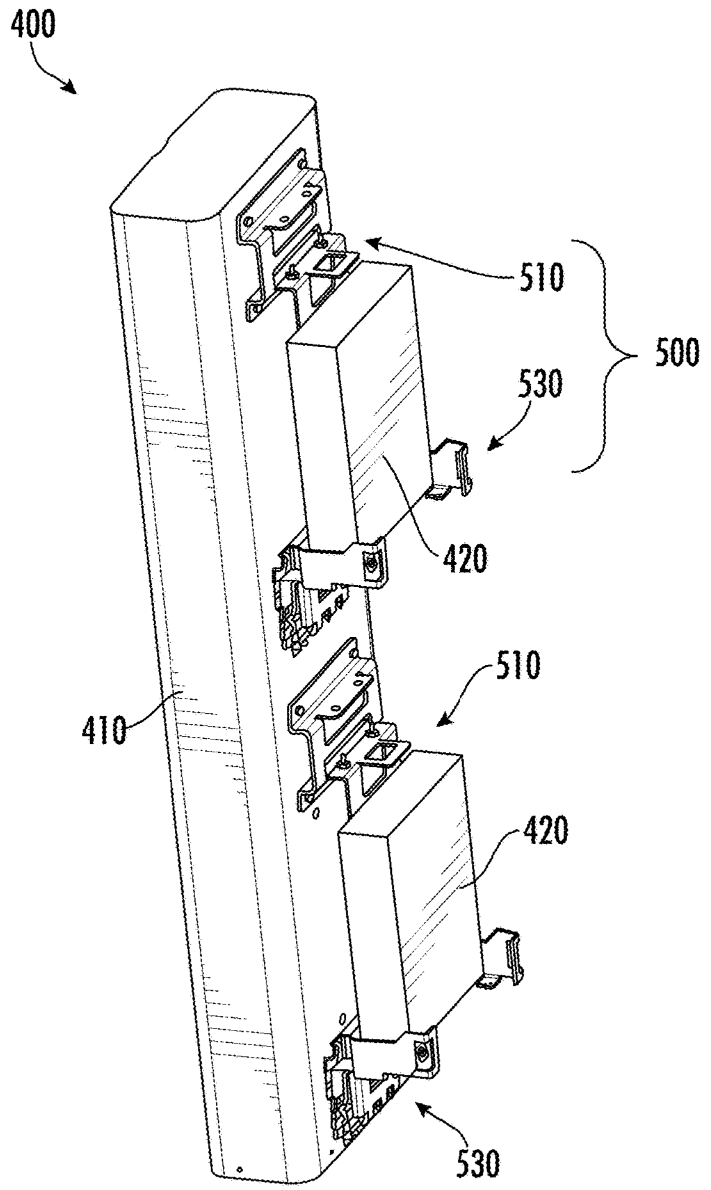
FIG. 11A is a rear perspective view of an antenna and radio assembly utilizing a mounting assembly according to embodiments of the present invention.
Figure 11B:
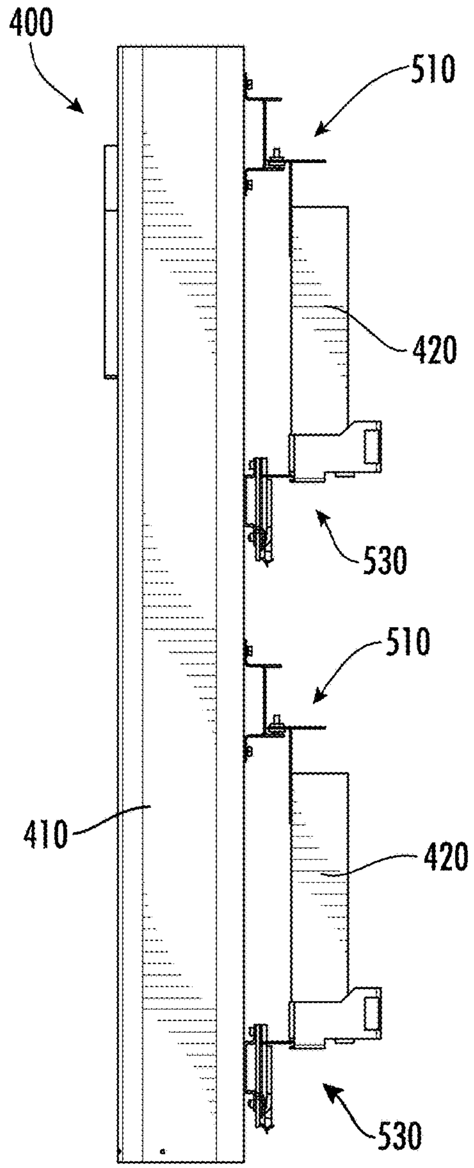
FIG. 11B is a side view of the antenna and radio assembly of FIG. 11A.

Referring now to FIGS. 11A-11B, an antenna-radio assembly 400 according to embodiments of the present invention is illustrated. The antenna-radio assembly 400 comprises an antenna 410 and one or more radios 420 mounted thereto. In some embodiments, the antenna-radio assembly 400 utilizes a mounting assembly 500 which may provide for easier and more efficient mounting of the radios 420 onto the antenna 410. As shown in FIGS. 11A-11B, in some embodiments, each mounting assembly 500 includes an upper bracket assembly 510 and a lower bracket assembly 530. The upper and lower bracket assemblies 510, 530 of the mounting assembly 500 will be described in further detail below.

Figure 12A:
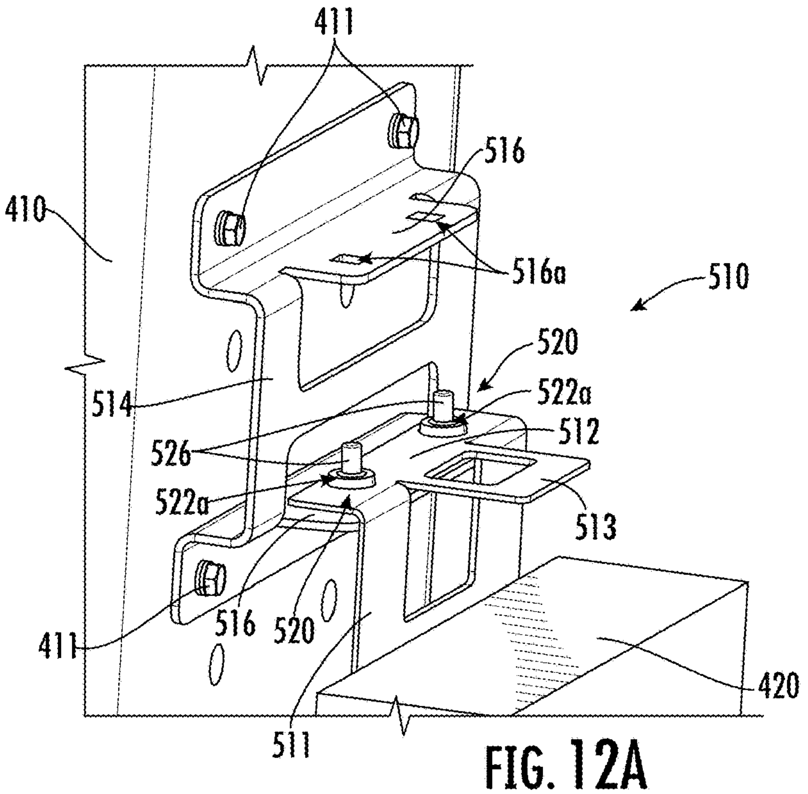
FIG. 12A is an enlarged rear perspective view of an upper bracket assembly for the mounting assembly of FIG. 11A according to embodiments of the present invention.

FIG. 12A illustrates the upper bracket assembly 510 in greater detail. As shown in FIG. 12A, the upper bracket assembly 510 comprises a first bracket member 511 and a second bracket member 514. The first bracket member 511 is configured to be secured to the radio 420. The second bracket member 514 is configured to be secured to the antenna 410 (e.g., via fasteners 411). The first bracket member 511 is configured to be mounted to the second bracket member 514 to secure the upper part of the radio 420 to the antenna 410.

As shown in FIG. 12A, in some embodiments, the first bracket member 511 comprises a flanged end 512 extending outwardly therefrom. The flanged end 512 comprises a pair of apertures 522*a* and forms part of the engagement points 520 between the first bracket member 511 and the second bracket member 514 which will be described in further detail below. In some embodiments, the first bracket member 511 may further comprise a gripping member 513 extending outwardly in an opposing direction from the flanged end 512. The gripping member 513 may provide a location for an installer to hold onto the first bracket member 511 in order to lift the radio 420 (i.e., when the first bracket member 511 has been secured to the radio 420) during installation.

As further shown in FIG. 12A, in some embodiments, the second bracket member 514 comprises at least one flanged end 516 extending outwardly therefrom. In some embodiments, the second bracket member 514 has two flanged ends 516 extending outwardly therefrom. In some embodiments, the flanged ends 516 comprise a pair of apertures 516*a*. The apertures 516*a* are configured to receive a respective pin or rod 526 therethrough. In other embodiments, the pins or rods 526 are coupled directly to the flanged end(s) 516 and extend upwardly therefrom. As described in further detail below, the pins or rods 526 are configured to be received by a corresponding aperture 522*a* of the first bracket member to the engagement points 520 between the first bracket member 511 and the second bracket member 514.

Figure 12B:
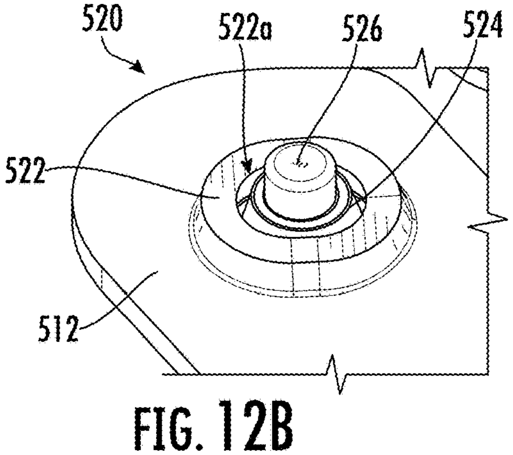
FIG. 12B is an enlarged view of an engagement point of the upper bracket assembly of FIG. 12A according to embodiments of the present invention.
Figure 12C:
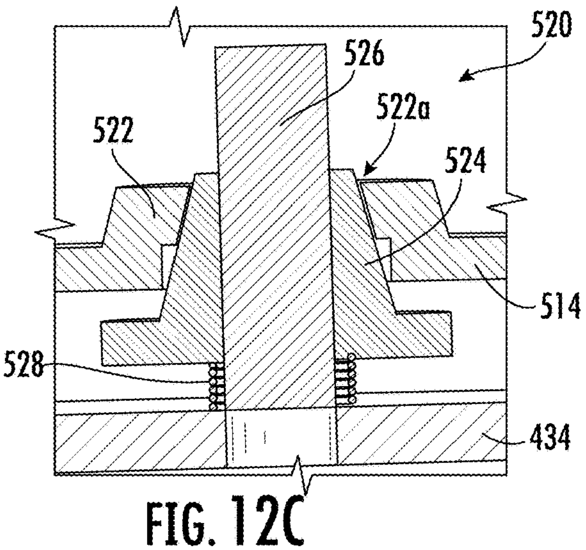
FIG. 12C is a side cross-sectional view of the engagement point of the upper bracket assembly of FIG. 12B according to embodiments of the present invention.

Referring to FIGS. 12B-12C, an engagement point 520 for the upper bracket assembly 510 (i.e., between the first and second brackets 511, 314) is illustrated in greater detail. Some of the features of the engagement points 520 for the upper bracket assembly 510 may be similar to the features of the engagement points 320 for the upper bracket assembly 310 described herein. As described above, in some embodiments, each flanged end 516 of the second bracket member 514 comprises a pin or rod 526 extending upwardly therefrom. As shown in FIG. 12C, in some embodiments, the pin 526 may extend through a tapered washer 524. In some embodiments, the tapered washer 524 may be tapered at an angle of between about 3 degrees and about 15 degrees. In some embodiments, a spring or like biasing member 528 resides below the tapered washer 524. As further noted above, in some embodiments, the flanged end 512 of the first bracket 511 comprises a pair of apertures 522*a* (only one shown in FIGS. 12B-12C) having a convex tapered edge 522.

During installation, the first bracket member 511 is secured to the radio 420 and the second bracket member 514 is secured to the antenna 410. The first bracket member 511 is positioned such that the apertures 522*a* of the first bracket member 311 are aligned with the pins 526 of the second bracket member 514, and the first bracket 511 is lowered onto the second bracket 514 such that the pins 526 are received within a respective aperture 522*a* (i.e., engagement points 520 between the first and second bracket members 511, 514) (see also, e.g., FIG. 12A). In some embodiments, the tapered edges 522 of the apertures 522*a* of the first bracket member 512 correspond with the tapered edges of the washers 524 (the pins 526 of the second bracket member 514 extend through the washers 524) to help guide the first bracket member 511 onto the second bracket member 514 and form a firm connection (engagement point 520) between the first and second bracket members 511, 514. The spring or biasing member 528 allows for adjustment when a higher installation accuracy in the vertical direction is needed.

In some embodiments, one of the apertures 522*a* of the first bracket member 511 may have a generally round shape and the other aperture 522*a* of the first bracket member 511 may have a generally oval or oblong shape. The round aperture 522*a* may be used to help position the first bracket member 511 onto one of the pins 526 of the second bracket member 514. The oval or oblong aperture 522*a* may then be positioned to receive the other pin 526 of the second bracket member 514 with the oval or oblong shape of the aperture 522*a* helping to absorb tolerances (variances) in the location of the second pin 526 of the second bracket member 514 relative to the first pin 526.

Figure 13A:
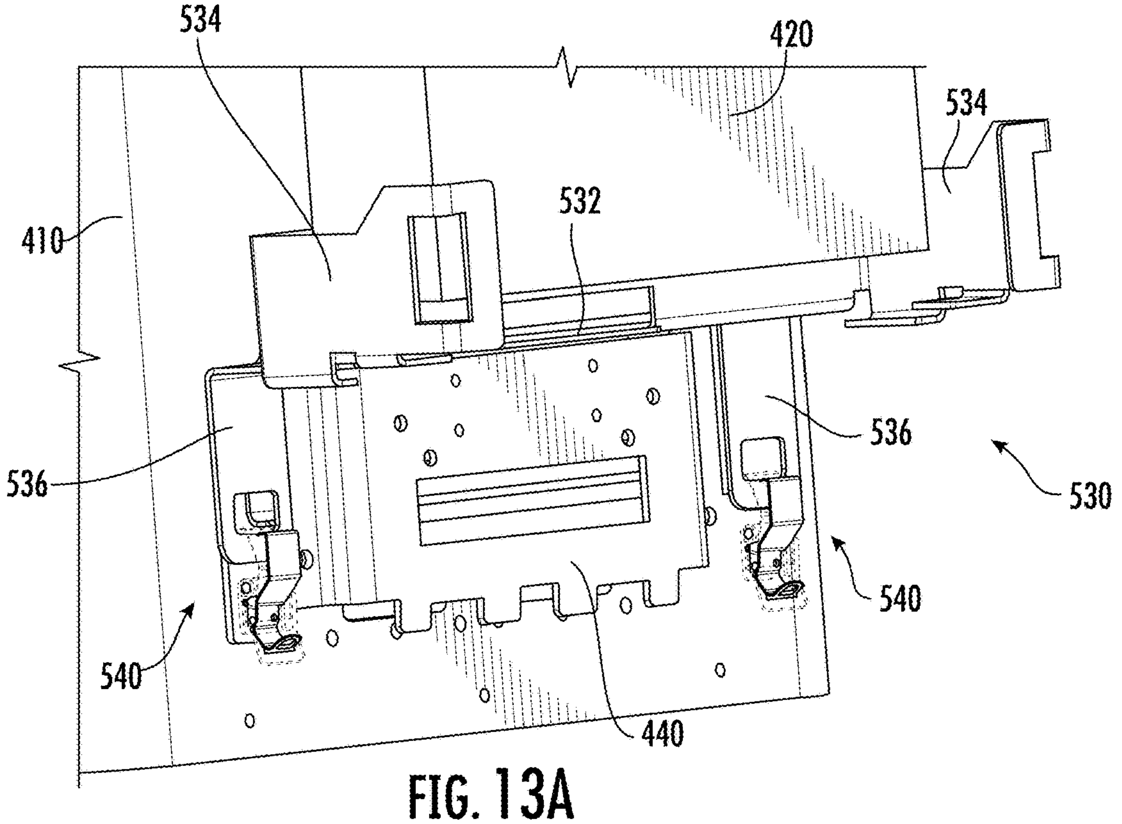
FIG. 13A is an enlarged perspective view of a lower bracket assembly for the mounting assembly of FIG. 11A according to embodiments of the present invention.
Figure 13B:
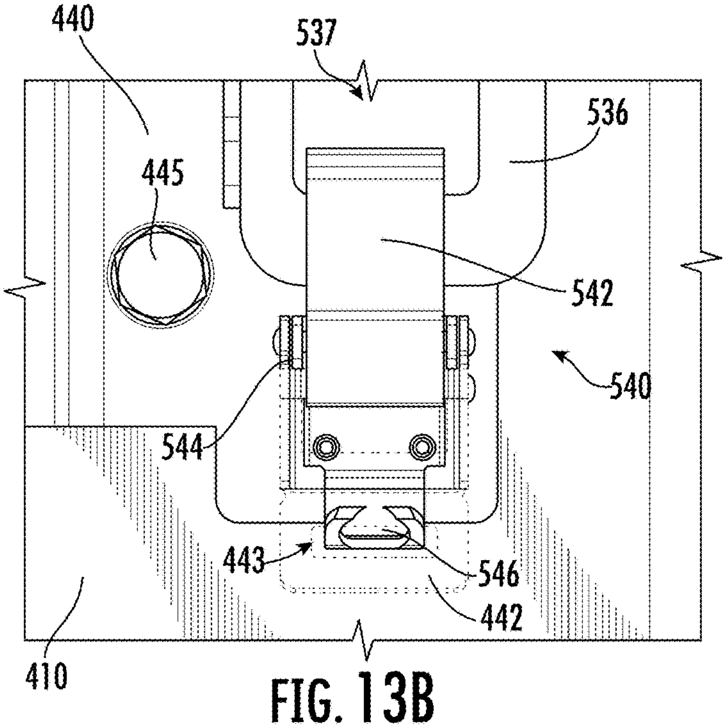
FIG. 13B is a rear view of a latching mechanism for the lower bracket assembly of FIG. 13A according to embodiments of the present invention.
Figure 13C:
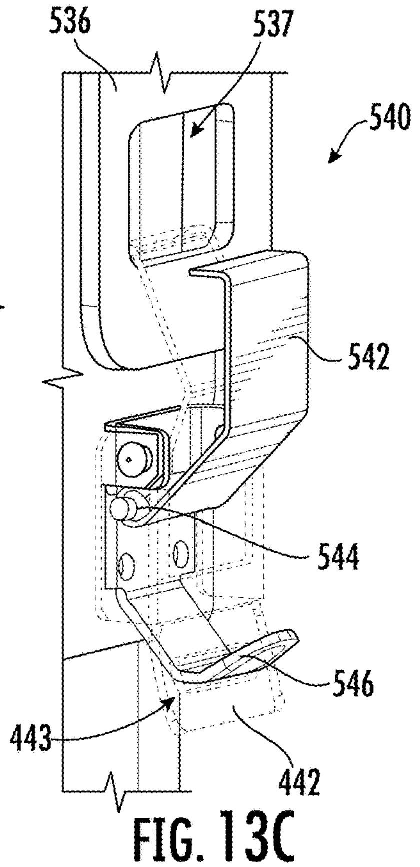
FIG. 13C is a side perspective view of the latching mechanism of FIG. 13B.

Referring now to FIGS. 13A-13C, the lower bracket assembly 530 of the mounting assembly 500 is illustrated in greater detail. As shown in FIG. 13A, in some embodiments, the lower bracket assembly 530 comprises a first bracket member 532 and a second bracket member 440. The first bracket member 532 is configured to engage with the radio 420 and the second bracket member 440 is configured to be secured to the antenna 410 (e.g., via bolts 445). As described in further detail below, the first bracket member 532 is configured to engage with the second bracket member 440 via a pair of locking mechanisms 540 to secure the bottom of the radio 420 to the antenna 410.

As further shown in FIG. 13A, in some embodiments, the first mounting bracket 532 comprises a pair of arm members 534 extending outwardly therefrom. The arm members 534 are configured to engage a bottom end of the radio 420. In some embodiments, the first mounting bracket 532 may be further secured to the radio 420, for example, via one or more fasteners (not shown). As shown in FIGS. 13A-13C, in some embodiments, the first mounting bracket 532 further comprises a pair of leg members 536 extending downwardly therefrom. Each leg member 536 comprises an opening 537 configured to receive and engage with a respective locking mechanism 540 coupled to the second mounting bracket 440.

A locking mechanism 540 of the lower bracket assembly 530 is illustrated in greater detail in FIGS. 13B-13C. As shown in FIGS. 13B-13C, in some embodiments, the locking mechanism 540 comprises a latching member 542. The latching member 542 is pivotably or rotatably coupled to the second mounting bracket 440 via a hinge 544. After the upper portion of the radio 420 has been secured to the antenna 410 via the upper bracket assembly 510 as described above, each of the leg members 536 of the lower bracket assembly 530 are positioned to align with a respective locking mechanisms 540. The latching members 542 are then pivoted upwardly to engage a respective leg members 536 (i.e., through a corresponding opening 537 the leg members 536), thereby securing the lower portion of the radio 420 to the antenna 410.

As further shown in FIGS. 13B-13C, in some embodiments, each locking mechanism 540 may further comprise a support member 546. In some embodiments, each support member 546 is configured to engage with a support bracket 442 coupled to the second mounting bracket 440. The support bracket 442 may comprise a slot or aperture 443 configured to receive the support member 546. The support member 546 and support bracket 442 help to prevent the lower portion of the radio 420 from moving away from the antenna 410, for example, if the latching member 542 become disengaged.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

What is claimed is:

1. An antenna mounting assembly for a metrocell antenna, the antenna mounting assembly comprising:

an upper bracket assembly, the upper bracket assembly comprises:

a first bracket including a pair of apertures each having a convex tapered edge; and a second bracket including a pair of pins extending upwardly therefrom, each pin configured to be received by a respective aperture of the first bracket to define an engagement point between the first and second brackets of the upper bracket assembly; and a lower bracket assembly, the lower bracket assembly comprises:

a first bracket having opposing flanged ends extending downwardly therefrom, each flanged end comprising an aperture; and a second bracket having opposing flanged ends extending downwardly therefrom, each flanged end comprising an aperture, wherein the flanged ends of the first bracket are configured to align with the flanged ends of the second bracket such that respective fasteners are received through the aligned apertures to define an engagement point between the first and second brackets of the lower bracket assembly.

2. The antenna mounting assembly according to claim 1, wherein the metrocell antenna is a wrap-around or a snap-around metrocell antenna comprising a first antenna enclosure, a second antenna enclosure, and a third antenna enclosure that can be coupled together to capture a mounting pole therebetween such that the mounting pole extends through a central opening, and wherein the first antenna enclosure is secured to the first brackets of the upper and lower bracket assemblies and the second and third antenna enclosures are secured to the second brackets of the upper and lower bracket assemblies.

3. The antenna mounting assembly according to claim 1, wherein each aperture of the first bracket of the upper bracket assembly resides in an opposing flanged end of the first bracket, and wherein each pin of the second bracket of the upper bracket assembly resides in an opposing flanged end of the second bracket.

4. The antenna mounting assembly according to claim 2, wherein the first and second brackets of the upper bracket assembly further comprise a mounting plate configured to be secured to a respective antenna enclosure.

5. The antenna mounting assembly according to claim 2, wherein the first and second brackets of the lower bracket assembly further comprise a mounting plate configured to be secured to a respective antenna enclosure.

6. The antenna mounting assembly according to claim 2, wherein the second bracket of the upper bracket assembly is configured to have a clamping bracket secured thereto, the clamping bracket configured to be secured to the mounting pole.

7. The antenna mounting assembly according to claim 1, wherein one of the apertures of the first bracket of the upper bracket assembly has a generally round shape and the other aperture of the first bracket of the upper bracket assembly has a generally oval or oblong shape.

8. The antenna mounting assembly according to claim 1, wherein the lower bracket assembly further comprises a first sliding members coupled to the first bracket and a second and third sliding member coupled to the second bracket, and wherein each sliding member comprises opposing flanged ends extending outwardly therefrom, each flanged end comprises a slot configured to receive a respective fastener extending downwardly from the first and second brackets, the fasteners are configured to slide within the slots, thereby allowing the sliding members to move back-and-forth in a radially direction relative to the respective brackets.

9. An antenna assembly, the antenna assembly comprising:

an antenna comprising a first enclosure, a second enclosure, and a third enclosure;

an antenna mounting assembly, the antenna mounting assembly comprising:

an upper bracket assembly, the upper bracket assembly comprising a first bracket including a pair of apertures each having a convex tapered edge; and a second bracket including a pair of pins extending upwardly therefrom, each pin configured to be received by a respective aperture of the first bracket to define an engagement point between the first and second brackets of the upper bracket assembly; and a lower bracket assembly, the lower bracket assembly comprising a first bracket having opposing flanged ends extending downwardly therefrom, each flanged end comprising an aperture; and a second bracket having opposing flanged ends extending downwardly therefrom, each flanged end comprising an aperture, wherein the flanged ends of the first bracket are configured to align with the flanged ends of the second bracket such that respective fasteners are received through the aligned apertures to define an engagement point between the first and second brackets of the lower bracket assembly;

a clamping bracket coupled to the second bracket of the upper bracket assembly of the antenna mounting assembly, the clamping bracket comprising a clamp member and a fastener, wherein the first, second and third antenna enclosures are secured to the upper and lower bracket assemblies, and wherein the clamping bracket secures the antenna mounting assembly to a mounting pole.

10. The antenna assembly according to claim 9, wherein the clamp member of the clamping bracket further comprises opposing flange edges having open-ended slots, the open-ended slots configured to receive a respective fastener secured to the second bracket of the upper bracket assembly.

11. The antenna assembly according to claim 9, wherein each aperture of the first bracket of the upper bracket assembly resides in an opposing flanged end of the first bracket, and wherein each pin of the second bracket of the upper bracket assembly resides in an opposing flanged end of the second bracket.

12. The antenna assembly according to claim 9, wherein the lower bracket assembly further comprises a first sliding members coupled to the first bracket and a second and third sliding member coupled to the second bracket, and wherein each sliding member comprises opposing flanged ends extending outwardly therefrom, each flanged end comprises a slot configured to receive a respective fastener extending downwardly from the first and second brackets, the fasteners are configured to slide within the slots, thereby allowing the sliding members to move back-and-forth in a radially direction relative to the respective brackets.

13. The antenna assembly according to claim 12, wherein each sliding member further comprise a latching member extending downwardly therefrom, the latching members configured to engage a metal ring positioned around a mounting structure to secure the bottom of the antenna.

14. A mounting assembly for an antenna and radio assembly, the mounting assembly comprising:

an upper bracket assembly, the upper bracket assembly comprising:

a first bracket member and a second bracket member, the first bracket member configured to be secured to an antenna and the second bracket member configured to be secured to a radio, the first bracket member configured to be mounted to the second bracket member to secure an upper portion of the radio to the antenna; and a lower bracket assembly, the lower bracket assembly comprising:

a first bracket member and a second bracket member, the first bracket member configured to engage with the radio and the second bracket member configured to be secured to the antenna, the first bracket member configured to engage with the second bracket member via a pair of locking mechanisms to secure a lower portion of the radio to the antenna.

15. The mounting assembly according to claim 14, the first bracket member of the upper bracket assembly comprising a flanged end comprising a pair of apertures having a convex tapered edge, the second bracket member of the upper bracket assembly comprising a flanged end comprising a pair of pins, wherein the pins of the second bracket member are configured to be received by the apertures of the first bracket member.

16. The mounting assembly according to claim 15, wherein each pin extends through a tapered washer, the pins and the tapered washers are configured to be received within a respective aperture of the first bracket member.

17. The mounting assembly according to claim 16, wherein a spring or biasing member resides below each tapered washer.

18. The mounting assembly according to claim 14, wherein the first mounting bracket of the lower bracket assembly comprises a pair of arm members extending outwardly therefrom, the arm members configured to engage a bottom end of the radio.

19. The mounting assembly according to claim 14, wherein the first mounting bracket of the lower bracket assembly further comprises a pair of leg members extending downwardly therefrom, each leg member comprises an opening configured to receive and engage with a latching member of a respective locking mechanism coupled to the second mounting bracket.

20. The mounting assembly according to claim 19, wherein the latching member is pivotably or rotatably coupled to the second mounting bracket via a hinge to engage with a respective leg members of the first mounting bracket of the lower bracket assembly.

* * * * *